US012743051B2

(12) United States Patent
Smeeton et al.

(10) Patent No.: US 12,743,051 B2
(45) Date of Patent: Sep. 22, 2026

(54) HOLOGRAPHIC LIGHT DETECTION AND RANGING

(71) Applicant: Dualitas Ltd, Milton Keynes (GB)

(72) Inventors: Timothy Smeeton, Milton Keynes (GB); Abdullah Asmari, Milton Keynes (GB); Gavin Fowler, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 790 days.

(21) Appl. No.: 18/005,457

(22) PCT Filed: Jun. 21, 2021

(86) PCT No.: PCT/EP2021/066783
§ 371 (c)(1),
(2) Date: Jan. 13, 2023

(87) PCT Pub. No.: WO2022/028764
PCT Pub. Date: Feb. 10, 2022

(65) Prior Publication Data

US 2023/0266711 A1 Aug. 24, 2023

(30) Foreign Application Priority Data

Aug. 5, 2020 (GB) ..................................... 2012142

(51) Int. Cl.
*G03H 1/22* (2006.01)
*G01S 7/481* (2006.01)
*G03H 1/08* (2006.01)

(52) U.S. Cl.
CPC ......... *G03H 1/2294* (2013.01); *G01S 7/4817* (2013.01); *G03H 1/0808* (2013.01); *G03H 2001/2297* (2013.01)

(58) Field of Classification Search
None
See application file for complete search history.

(56) References Cited

U.S. PATENT DOCUMENTS

2017/0003392 A1* 1/2017 Bartlett .................. G01S 17/42
2019/0162823 A1* 5/2019 Eckstein .............. G01S 13/865
(Continued)

FOREIGN PATENT DOCUMENTS

KR 10-2020-0057773 A 5/2020

OTHER PUBLICATIONS

Office Action mailed on Jul. 8, 2025 in Korean App. 10-2023-7004332 (8 pages).

(Continued)

*Primary Examiner* — Eric L Bolda
(74) *Attorney, Agent, or Firm* — McDonnell Boehnen Hulbert & Berghoff LLP

(57) ABSTRACT

A LIDAR system for scene surveying comprises a spatial light modulator for displaying a diffractive pattern comprising a hologram of a light footprint, and a light source for illuminating the diffractive pattern to form a holographic reconstruction of the light footprint on a holographic replay plane in the scene. The light footprint comprises an array of light features. The system comprises a display driver for controlling the spatial light modulator and changing the diffractive pattern with time. The diffractive pattern is changed with time such that each light feature of the array of light features scans a respective sub-area of the scene. The system comprises a detection system having a plurality of light detecting elements and that is configured such that each light detecting element detects light from a respective individual field of view within the scene. Each sub-area of the scene contains a plurality of individual fields of view.

20 Claims, 22 Drawing Sheets

(56) References Cited

U.S. PATENT DOCUMENTS

| | | | | |
|---|---|---|---|---|
| 2021/0124235 | A1* | 4/2021 | Sickler | G02F 1/2955 |
| 2021/0286319 | A1* | 9/2021 | Cole | G01S 7/4865 |

OTHER PUBLICATIONS

English translation of Office Action mailed on Jul. 8, 2025 in Korean App. 10-2023-7004332 (8 pages).

Combined Search and Examiner Report for GB2012142.2, Dated Apr. 15, 2021.

Search Report and Written Opinion for PCT/EP2021/066783, Dated Sep. 28, 2021.

* cited by examiner

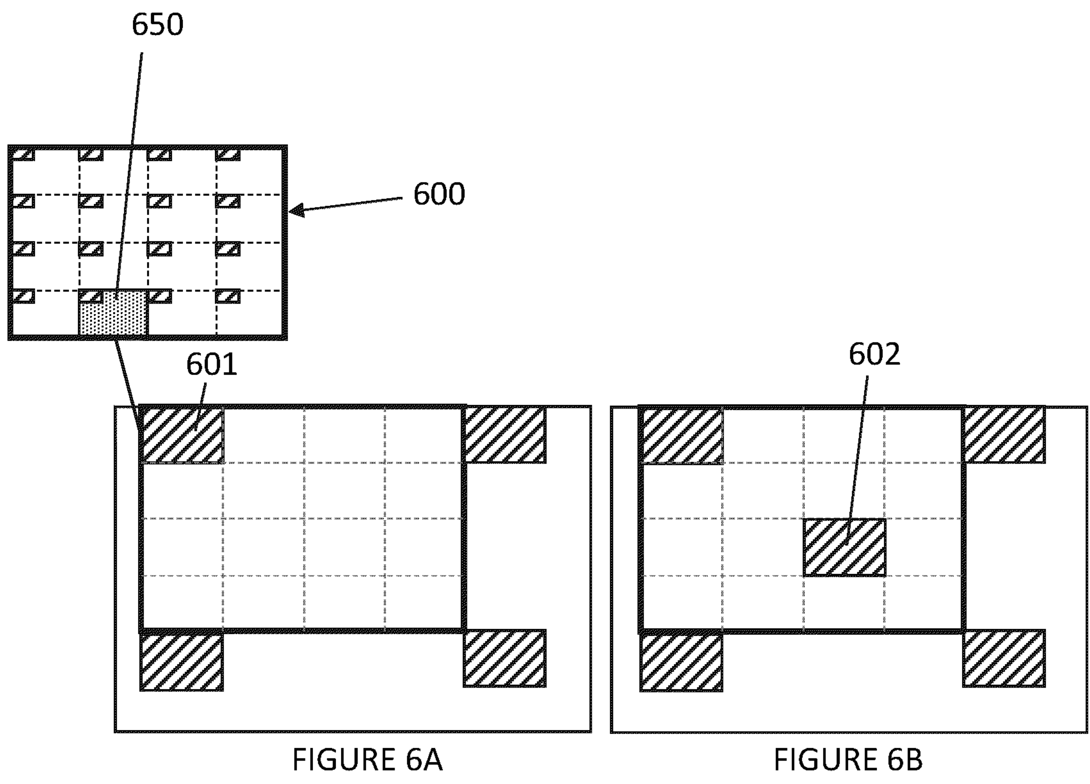
FIGURE 6A
FIGURE 6B
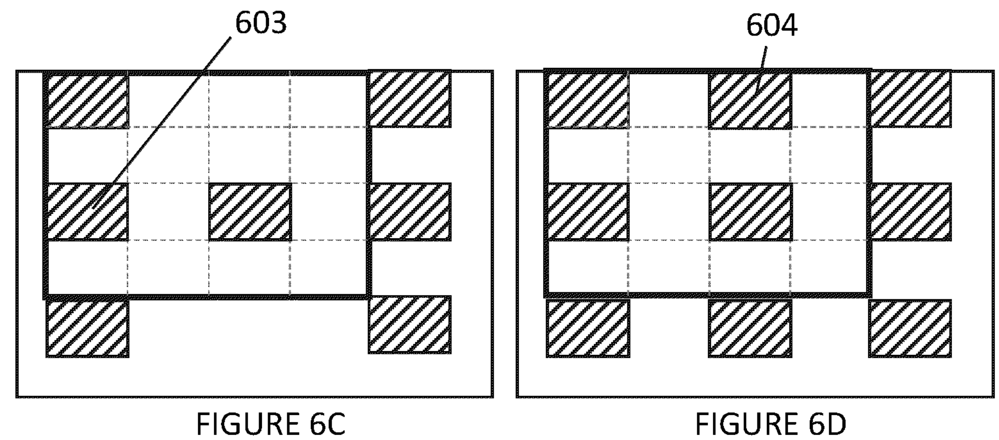
FIGURE 6C
FIGURE 6D

HOLOGRAPHIC LIGHT DETECTION AND RANGING

RELATED APPLICATIONS

This application claims the benefit under 35 U.S.C. § 371 of the filing date of International Patent Application No. PCT/EP2021/066783, having an international filing date of Jun. 21, 2021, which claims priority to United Kingdom Application No. 2012142.2, filed Aug. 5, 2020, the contents of both of which are incorporated herein by reference in their entirety.

FIELD

The present disclosure relates to a light projector. More specifically, the present disclosure relates to a holographic projector, holographic projection system, a method of holographic projection and holographic projection system. Embodiments relate to a light detection and ranging system. Some embodiments relate to a method of light detection and ranging. Some embodiments relate to a method of surveying a scene with a computer-controlled light footprint.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM in transmission.

A holographic projector for imaging may be provided using the system described herein. Such projectors have found application in head-up displays, "HUD", and head-mounted displays, "HMD", including near-eye devices, for example. The holographic projector may be used for light detection and ranging. Light detection ranging systems may be used in a variety of applications including portable devices and vehicles.

The present disclosure is concerned with improvements in light detection and ranging systems. In particular, such improvements may include faster, more reliable and/or more accurate techniques for surveying an area of a scene, in order to detect features of interest, using light detection and ranging.

SUMMARY

Aspects of the present disclosure are defined in the appended independent claims.

There is provided a light detection and ranging, "LIDAR" system arranged to survey a scene. The LIDAR system comprises a spatial light modulator arranged to display a diffractive pattern comprising a hologram of a light footprint. The LIDAR system further comprises a light source arranged to illuminate the diffractive pattern to form a holographic reconstruction of the light footprint. The holographic reconstruction of the light footprint is projected onto the scene. In some embodiments, an intermediate holographic reconstruction is formed between the spatial light modulator and a projection lens arranged to project the light footprint onto the scene by imaging the intermediate holographic reconstruction. In other embodiments, the holographic reconstruction is projected directly onto the scene (i.e. without formation of an intermediate holographic reconstruction and without need for a projection lens). In accordance with the present disclosure, the light footprint comprises an array of light features. For example, each light feature of the array of light features may be at least one of: a light spot, a pattern of light spots, a scanning line and a plurality of parallel scanning lines. Each light feature—e.g. each light spot—may comprise a plurality of image pixels. The LIDAR system further comprises a display driver arranged to control the spatial light modulator and change the diffractive pattern with time. The diffractive pattern is changed with time such that each light feature of the array of light features scans a respective sub-area of the scene. It may be said that the diffractive pattern is changed so as to move each light feature to a different position along a scanning path within its respective sub area. The scanning path may be continuous/unbroken or discontinuous comprising discrete steps/jumps within the sub area. Thus, each light feature of the array of light features is uniquely associated with a given sub area. The LIDAR system comprises a detection system having a plurality of light detecting elements. The detection system is configured such that each light detecting element detects light from a respective individual field of view within the scene. Each sub-area of the scene contains a plurality of individual fields of view.

Accordingly, the scene surveyed by the LIDAR system (also referred to herein as the "field of view" of the LIDAR system) is divided into a plurality of sub areas. The plurality of sub-areas may form a substantially continuous area of the scene. The sub-areas may be substantially non-overlapping. Each sub area may be quadrilateral in shape. In accordance with the present disclosure, each of the plurality of sub areas is simultaneously illuminated by a light feature of the array of light features forming the light footprint. In particular, each light feature (formed within the primary or zero diffraction order) is uniquely associated with a sub area of the field of view of the LIDAR system. Thus, each light feature is moved to a plurality of scanning positions along a scanning path within its respective sub area in order to individually scan that sub area. The optical power in each sub area may therefore be controlled. Control of the optical power of projected laser light is desirable for eye safety reasons as discussed herein. In embodiments, the optical power of the light footprint in each sub-area is "eye safe". As discussed further below, although standards vary across jurisdictions and depend on the wavelength of light, optical power below a threshold value of about 1.0 mW (at 905 nm) distributed within a 7 mm circular aperture diameter, is generally considered to be "eye safe".

By using a LIDAR illumination pattern (light footprint) comprising an array of light features, where each light feature corresponds to a respective sub area of the scene, each sub area receives light at the same time. By changing the diffractive pattern so that each light feature of the illumination pattern scans its respective sub area, all of the sub areas of the scene can be scanned at the same time. In this way, the entire scene can be scanned more quickly and more accurately, as described herein.

The array of light features may comprise a regular or ordered array of light features forming an illumination pattern (light footprint). For instance, in some examples, the array comprises an ordered array of rows and columns of discrete light spots, where each light spot is formed at the same relative position within its respective sub area. Thus, in this example, the light feature is a single light spot, which is formed to scan each sub area. In other examples, the array may include more than one light spot arranged in a pattern that is formed in a respective sub area, such that the array comprises an ordered arrangement of rows and columns of the pattern of light spots. Thus, in this example, the light feature is a pattern of light spots, wherein the light spots may be adjacent to each other (contiguous) or spatially separated from each other (discrete). In particular, each light feature comprising a pattern of light spots may form multiple scanning spots (discrete light spots), or one or more scanning lines or the like, for individually scanning a respective sub area of the scene. In either case, each light spot may comprise a plurality of contiguous image pixels arranged in a quadrilateral shape, a circular/elliptical shape or the like. In some embodiments, each light feature comprises at least one line of light—e.g. straight line of light—referred to herein as a "scanning line". A scanning line may be formed by a plurality of contiguous light spots formed in a straight line or may be formed of a continuous discrete light feature in the shape of a straight line. Each scanning line may comprise a plurality of contiguous image pixels arranged in a straight line of at least one image pixel in thickness.

In some embodiments, the display driver is arranged to change the diffractive pattern with time by changing the hologram of the diffractive pattern in order to scan the sub areas of the scene. In particular, the hologram may be changed to reposition the array of light features so that each light feature is repositioned within its respective sub area. By repositioning a light feature within a respective sub area, it is possible to scan the entire sub area. Every sub area of the scene is scanned at the same time by the array of light features. Thus, by changing the diffractive pattern according to a sequence of different holograms, with the array of light features at multiple different positions, it is possible to scan the entire area of the scene.

In other embodiments, the display driver is arranged to move the projected light footprint over the scene. In particular, the array of light features of the projected light footprint is moved, in sequence, to multiple different positions on the scene. Specifically, multiple different positions of the light footprint may be selected to form each light feature of the array of light features at multiple different positions within its respective sub area of the scene. By forming a light feature at the multiple different positions within a respective sub area, it is possible to scan the entire sub area. Every sub area of the scene is scanned at the same time by the array of light features. Thus, the entire area of the scene is scanned by means of a sequence multiple different positions of the light footprint. In this case, the hologram may not be changed.

In some embodiments, the diffractive pattern comprises a grating function (also referred to as a "software grating") that determines the position of the light footprint on the holographic replay plane. In particular, a grating function controls the position of the holographic replay field on the replay plane. The holographic reconstruction of the light footprint is formed on a holographic replay plane, which may be an intermediate plane or in the scene. Thus, the grating function of the diffractive pattern controls the spatial position of the projected light footprint in the scene. In some embodiments, the display driver is arranged to change the grating function of the diffractive pattern in order scan the sub areas of the scene. It may be said that the holographic reconstruction is spatially displaced or translated on the replay plane by changing the grating function. In some embodiments, the grating function is a phase-ramp function such as a wrapped or repeating phase-ramp function or modulo 27*r* phase-ramp function—for example, having a saw-tooth shape. The person skilled in the art will understand how the pitch of the grating (or the gradient of the phase-ramp) may be varied in order to vary the translation of the zero order replay field on the replay plane for scanning.

A "propagation axis" may be defined as the axis of modulated light propagating to the replay plane that forms the zeroth diffraction order (herein simply "zero order") replay field. In other words, the propagation axis is the line joining the centre of the array of pixels of the spatial light modulator to the centre of the zeroth order replay field. As described further below, the grating function has the effect of changing the direction of the propagation axis. For normal incidence of light on the spatial light modulator, and in the absence of a grating function, the propagation axis extends substantially normally through the centre of the zero order replay field. Thus, by simply changing the grating function of the diffractive pattern, for example without changing the hologram of the light footprint, it is possible to move the array of light features—e.g. light spots—of the light footprint to multiple different positions in order to simultaneously scan all of the sub areas of the scene.

The holographic reconstruction formed from the hologram comprises a zero-order replay field at the centre and a plurality of higher-order replay fields extending in +/−x and +/−y directions (on an x-y holographic replay plane) owing to the diffractive nature of the process. The higher-order replay fields are a lower brightness repeat of the zero-order replay field in a manner that will be familiar to the person skilled in the art of optics and diffraction. The maximum intensity across the holographic replay plane is non-uniform owing to the diffractive nature of the holographic process. That is, diffraction has the effect of modulating the intensity of the holographic reconstruction in accordance with a non-uniform intensity envelope (or cap). In some embodiments, the envelope is a sinc function or, more specifically, a since function. Reference herein to the intensity distribution across the replay plane being non-uniform is made as shorthand for the envelope that modulates the intensity of the holographic reconstruction. For example, if the hologram is a hologram of uniform brightness across the replay field, the holographic reconstruction formed at the actual replay field using the pixelated spatial light modulator will not be uniform in brightness owing to the intensity envelope. For shorthand, it is therefore said herein that the intensity distribution on the replay plane may be a sinc function (specifically a sinc squared—$sinc^2$—function as there are no negative intensity values) extending in both the x-direction and the y-direction. An intensity envelope in accordance with a $sinc^2$ function arises with a spatial light modulator comprising quadrilateral-shaped light modulating pixels. More accurately, it may be said that the intensity envelope comprises a first $sinc^2$ function in the x-direction and a second $sinc^2$ function in the y-direction. If the pixels of the spatial light modulator are not square, the first $sinc^2$ function is different to the second $sinc^2$ function. When a grating function is applied, the centre of the zero-order replay field is translated with respect to the $sinc^2$ intensity envelope.

In some embodiments, the light footprint comprises an array of light spots—that is, each light feature is a discrete light spot. Typically, each discrete light spot is formed from a plurality of contiguous image pixels in a desired light spot shape (e.g. quadrilateral or circular shape). It may be desirable to form light spots of uniform brightness. A hologram of an array of uniform brightness light spots may be calculated. However, owing to the intensity envelope, the brightness of the reconstructed light spots may vary across the replay plane. For example, the light spots formed at the centre of the light footprint of the zero-order holographic reconstruction may have higher intensity than light spots formed at the periphery thereof. A $sinc^2$ compensation scheme may be applied when calculating the hologram. For example, a $sinc^2$ compensation function may be applied to change the intensity values of the light spots to compensate for the intensity variation with spatial position. The $sinc^2$ compensation therefore minimises the intensity variation of the image spots of the (zero order) holographic reconstruction and so provides a more uniform intensity distribution across the replay field. However, when forming a hologram of a light footprint comprising an array of light spots (or other light features such as scanning lines), and moving the array of light spots without changing the hologram (e.g. by means of a grating function as described above), intensity variations between light spots may still occur, as described herein.

In particular, in some embodiments, the hologram is configured (e.g. calculated) to compensate for non-uniformity in intensity across the holographic replay plane based on a $sinc^2$ compensation function applied to the light footprint. The hologram is calculated after applying the $sinc^2$ compensation to the target image (i.e. desired light footprint) during scanning. However, in accordance with this disclosure, the light pattern is continually moved/translated in order to simultaneously scan a plurality of sub-areas using a corresponding plurality of respective light features. This scanning upsets the $sinc^2$ compensation because translation of the replay field occurs relative to the $sinc^2$ intensity envelope. This corruption of the $sinc^2$ compensation scheme means that the compensation is sub-optimal—the non-uniformity or variation in intensity of light features used to probe different parts of the scene may be increased (not minimised).

The holographic replay plane may be defined as an x-y plane, which receives spatially modulated light from the spatial light modulator that propagates about a propagation axis extending in the z-direction. Thus, the replay plane is spatially separated from the spatial light modulator by a propagation distance in the z-direction. The grating function may comprise an x-direction grating and a y-direction grating, which control the direction of the propagation axis, and thus the position of the light footprint on the replay plane in the x-direction and the y-direction, respectively. In some embodiments, the target image used to calculate the hologram is modified before hologram calculation in order to compensate for the intensity envelope and the use of a varying grating function/s. The hologram may be arranged to modulate the intensity of each light feature in the target image as a function of its distance from the centre of the intensity envelope. In an improvement, the hologram may be arranged to modulate the intensity of each light feature based on its average distance in x and average distance in y from the centre of the respective intensity envelope during the scan. More specifically, the brightness of each light feature of the array of light features of the target image (used to calculate the hologram) is modulated in accordance with the distance of the respective sub-area from the centre of the intensity envelope. This provides more optimised compensation by minimising the intensity variations of light features formed in different sub-areas across the whole of the scene during scanning thereof.

In some embodiments, the $sinc^2$ compensation value used for each light feature—e.g. light spot—(positionally) corresponds to the middle of its sub-area (e.g. a middle x-position and a middle y-position). It may be said that the target image that is $sinc^2$ compensated and used to calculate the hologram is such that each light feature of the array of light features is formed at a midpoint position (in the x direction and/or y direction) within its respective sub area. Furthermore, positive and negative x and y grating functions are used to provide the required translation of each light feature from its middle position within its sub-area in order to provide the multiple zone scanning in accordance with this disclosure.

In a surprising further improvement, the intensity of light features in a central region of the light footprint (target image) is boosted (i.e. increased such as multiplied by a factor/number greater than one) prior to $sinc^2$ compensation (and therefore prior to hologram calculation) in order to improve the overall uniformity of the illumination of the scene during scanning of the sub-areas. This is counterintuitive because the centre of the replay field is usually the brightest part of a holographic replay field. In accordance with this further improvement, the target intensities of the light features in the target image are unequal (prior to $sinc^2$ compensation). In some embodiments, the factor used to modify (e.g. amplify or boost) the central area target image prior to $sinc^2$ compensation is selected to increase or even maximise the uniformity of the array of light features—or, at least, a substantive portion of the array of light features—across all scan positions. The factor may be a constant or may be a function of position on the replay field such as distance from the centre of the replay field or distance from the maxima of the $sinc^2$ intensity envelope. In a variation, the intensity of each light feature is additionally or alternatively modified after $sinc^2$ compensation in order to improve uniformity of the illumination across all scan positions. In another variation, the intensity of peripheral light features (that is, light features near the edges or outside a central region) of the target image is decreased prior to further processing such as $sinc^2$ compensation and hologram calculation.

However, in some embodiments, the hologram is configured (e.g. calculated) such that the optical power of the light features of the array of light features of the light footprint varies with distance from the propagation axis. In particular, in some LIDAR applications, the area scanned at the periphery of the scene requires a different scanning power to the area scanned at the centre of the beam. For example, the centre of the scene may require long range scanning that requires higher power whilst the periphery of the scene may require short range scanning that requires lower power. Accordingly, the power of the light features formed in the respective sub areas may be adjusted depending on a property/requirement of the corresponding scene.

Each of the plurality of sub areas of the scene may be individually scanned at the same time and in the same manner. In some embodiments, individual scanning of sub areas may be formed in a systematic order of sequential scanning positions along a scanning path. The scanning positions of the scanning pattern or path are selected so that the entire sub area is scanned. For example, the diffractive pattern may be changed such that each light feature performs a raster scan (in the case of a light spot) or a horizontal/vertical line scan (in the case of a scanning line) of its respective sub-area. Thus, each sub area is scanned by a light spot moving in a raster scan sequence or order (from left to right and top to bottom of its respective sub areas) or a scanning line moving in a vertical or horizontal direction. In other embodiments, the diffractive pattern is changed such that each light feature performs a "patterned scan" of its sub-area. In particular, a patterned scan may be defined as a sequence of different positions of the light features within their respective sub areas, in a random or semi-random order or in a defined (temporal) pattern or order, such that regions of the sub area having a defined/minimum size do not remain without illumination for more than a threshold period of time.

Each light detection element (also referred to herein as light detecting elements) of the detection system is able to receive light from a defined area of the scene corresponding to the field of view thereof. It may be said that each individual light detection element has a corresponding individual field of view (herein "IFOV"). In accordance with the present disclosure, each sub area of the scene contains a plurality of IFOVs. Thus, each IFOV of a light detection element corresponds to only a part of a sub area of the scene. Accordingly, light reflected from a scene illuminated by an array of light features of the light footprint will be detected by only a subset of the plurality of light detection elements at a time (e.g. for each display event/corresponding exposure time). For example, each IFOV of a light detection element may receive light from a region illuminated by a single light feature of the array (i.e. a region that is the same size—e.g. has the same solid angle—as the part of a sub area illuminated by a single light feature at a particular scanning position). In such examples, it may be said that there is a one to one correlation between a single light feature of the light footprint and a single light detection element. In other examples, each IFOV of a light detection element may receive light from a region illuminated by more than one light feature formed over a single or multiple scanning positions, or a fraction of a light feature.

In embodiments, the detection system may comprise an array detector including the plurality of light detection elements. The array detector/plurality of light detection elements may comprise a charge-coupled device (CCD) camera, wherein each light detection element is an individual CCD of an array of CCD elements. In other embodiments, the array detector/plurality of light detection elements may comprise a single-photon avalanche diode (SPAD) array comprising an array of SPAD elements. Any other suitable form of photodetector comprising a plurality of light sensing elements is possible and contemplated. In embodiments, the array detector/plurality of light detection element is static. Thus, it may be said that the IFOV of each light detection element uniquely corresponds to a part of a sub area of the total field of view of the LIDAR system.

For optimal operation of a light detector array, it is important that light detected by the light detecting elements is not over a wide dynamic range, which may lead to saturation of some light detecting elements during fixed exposure time. In particular, a constant exposure time is typically chosen for all of the light detecting elements, which balances the need to sufficiently detect low intensity reflections by some light detecting elements whilst preventing saturation (over exposure) of other light detecting elements by high intensity reflections. Saturation of a light detecting element can render the element inoperable for a certain time period. Accordingly, in some embodiments, the exposure time associated with each light detecting element is constant, and the display driver is further configured to change the hologram in order to reduce the optical power of light in a particular sub area if a detected signal from that sub area indicates that the corresponding detector element is saturated and, optionally, at the same time increase the optical power of light in other sub areas.

In some embodiments, the LIDAR system further comprises an optical system arranged to magnify the sub areas. For example, optical elements may be provided, which expand the replay field up to a large emission aperture. This has the effect of spreading the light over large area at the aperture/window in a short optical path which advantageously increases the total amount of light that can be emitted from the aperture/window without exceeding laser safety limit powers within, for example, 7 mm diameter aperture.

In some embodiments, the periodicity of the array of light features forming the illumination pattern (light footprint) continues or extends into at least one first order holographic replay field. In such embodiments, the detection system is arranged to detect light from a region of the scene illuminated by light features of the zero order holographic replay field and from a region of the scene illuminated by light features of at least one higher order holographic replay field, in order to expand the field of view of the LIDAR system. In particular, the field of view of the projected illumination pattern (in which the light footprint/holographic reconstruction is formed in the scene) includes some spatially modulated light from higher orders as well as from the primary order—the zero order. It may be said that the LIDAR system uses a "hybrid replay field", which includes the zero order and a portion of one or more first orders. Use of some first order light is particularly suitable for illumination patterns which cover a wide range of the replay field with periodic variation because the first order and zero order combine to provide a seamless pattern. Since optical power is inherently used to form the first orders, using a portion of light of one or more first orders (that would otherwise be lost) for LIDAR illumination improves the optical efficiency, in terms of delivery of illumination into the scene. In addition, the field of view of the LIDAR system is increased. In particular, for applications requiring sensing in a field of view with high aspect ratio (e.g. much larger field of view in horizontal direction than in vertical direction), such as automotive applications, it is possible to provide a corresponding illumination pattern having a high aspect ratio using one or both of the first order replay fields in the +/−x-direction.

In some embodiments, the light features of the at least one higher order holographic replay field that are detectable by the detection system are formed in a region of the at least one higher order holographic replay field immediately adjacent (or neighbouring) the zero-order holographic replay field. In some examples, the region of the at least one higher-order holographic replay field constitutes less than 50%, such as less than 30%, of the total area of the at least one higher order holographic replay field. The combined approach of illuminating sub areas of the scene with a light footprint/ illumination pattern comprising an array of light features is well suited for combination with use of some of the first order holographic reconstruction to illuminate the scene, because the repeating pattern of the array of light features is reproduced at the edges of the zero order (in both the x and y directions).

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and is spatially-separated from the hologram.

The term "replay field" is used to refer to the 2D area within which the holographic reconstruction can be formed and fully focused. If the hologram is displayed on a spatial light modulator comprising pixels, the replay field will be repeated in the form of multiple diffracted orders, wherein each diffracted order is a replica of the zeroth-order replay field. The zeroth-order replay field generally corresponds to the preferred or "primary" replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete "image pixels".

The term "light footprint" is generally used, in this disclosure, to refer to the illumination pattern formed in the scene by reconstruction of a hologram. Each light footprint corresponds to formation of a holographic reconstruction in the scene. The light footprint is therefore an area of light within the scene (more specifically, within the replay field). The pattern of light may comprise multiple discrete areas of light (e.g. "light spots" or "scanning lines") separated by dark areas. The light detection and ranging system disclosed herein may be used to form a temporal sequence of light footprints within a scene.

The terms "scanning" and "surveying" are used synonymously herein to refer to the process of probing an area of a scene by illuminating it with one or more light footprints. Similarly, a "scan" or "survey" typically comprises a temporal sequence of light footprints, used in a process of probing an area of a scene. The term "light" is used herein in its broadest sense. Embodiments are equally applicable to visible light, infrared light and ultraviolet light, and any combination thereof.

Advantageously, the dynamically-reconfigurable holographic technique disclosed herein may be used to control parameters of the light footprint in real-time, so as to form a temporal sequence of light footprints for scanning a scene, as described herein.

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

Embodiments describe monochromatic light footprints by way of example only. In embodiments, the light footprint is a polychromatic light footprint. In embodiments, a composite colour light footprint is provided by combining a plurality of single colour light footprints. In embodiments, a plurality of single colour computer-generated holograms may be used to form each composite colour light footprint. Such wavelength diversity can increase throughput.

Embodiments describe ID and 2D light footprints by way of example only. In other embodiments, the light footprint is a 3D light footprint. That is, in embodiments, each computer-generated hologram forms a 3D holographic reconstruction.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram is a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field. Accordingly, the term “diffractive pattern” may refer to a diffractive pattern consisting of a hologram alone or combined with one or more other diffractive patterns.

BRIEF DESCRIPTION OF THE DRAWINGS

Specific embodiments are described by way of example only with reference to the following figures:

FIG. 6A-D show a temporal sequence of example light footprints for surveying a scene, similar to the example light footprints of FIG. 4, in accordance with still further embodiments;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as “after”, “subsequent”, “next”, “before” or suchlike—the present disclosure should be taken to include continuous and non-continuous events unless otherwise specified. For example, the description should be taken to include a case which is not continuous unless wording such as “just”, “immediate” or “direct” is used.

Although the terms “first”, “second”, etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
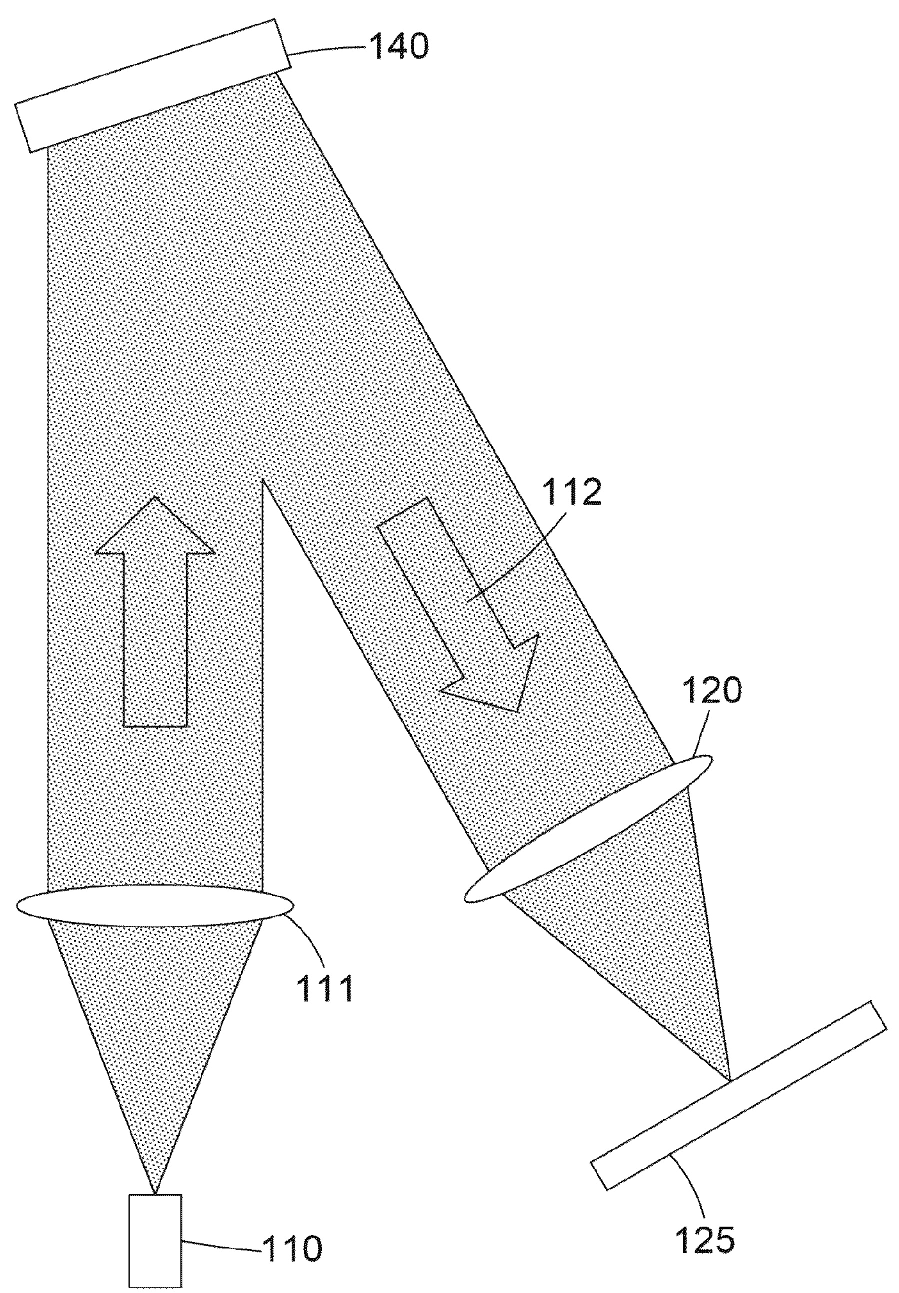
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, “LCOS”, device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125. The screen 125 is optional.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
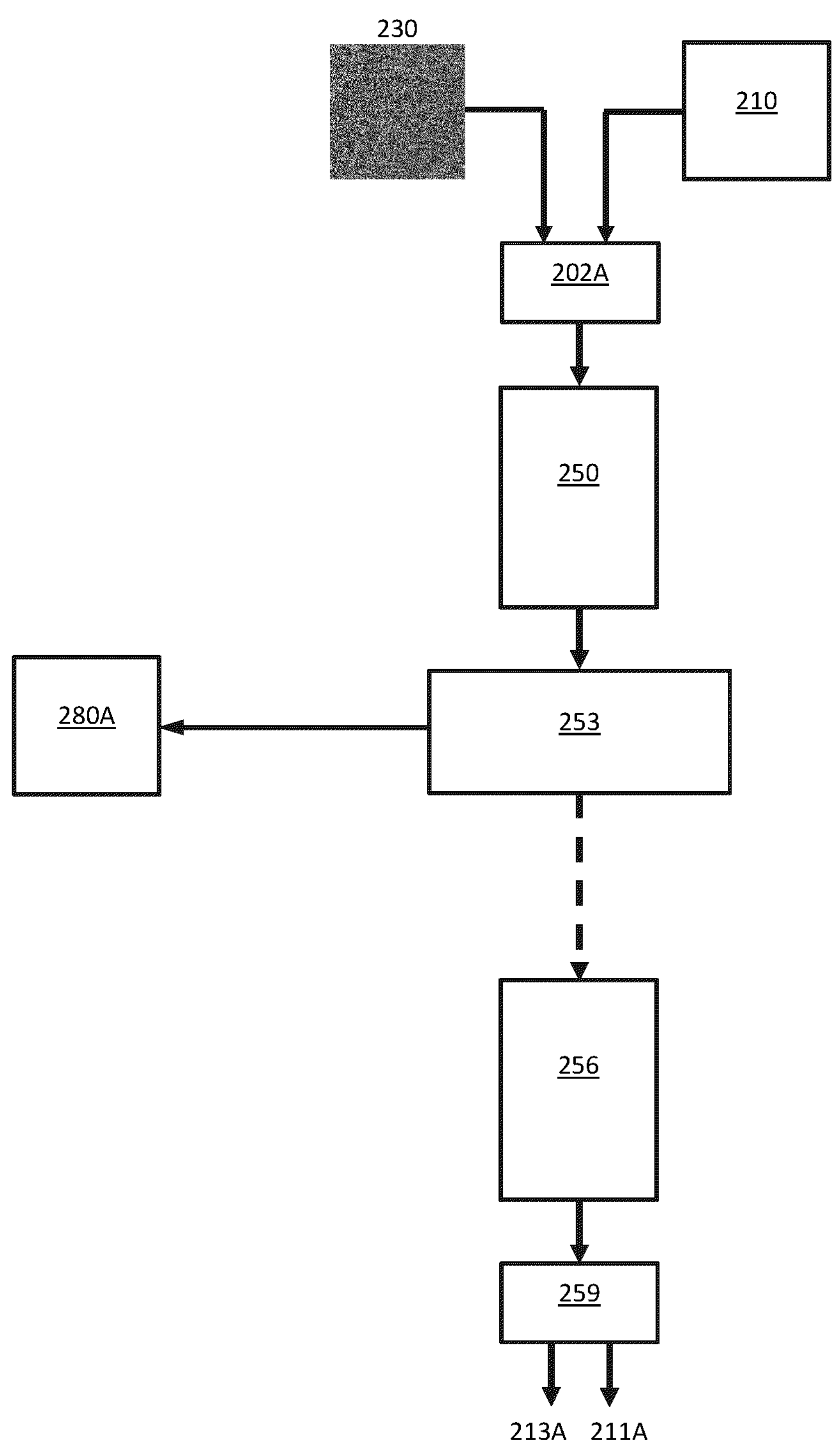
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
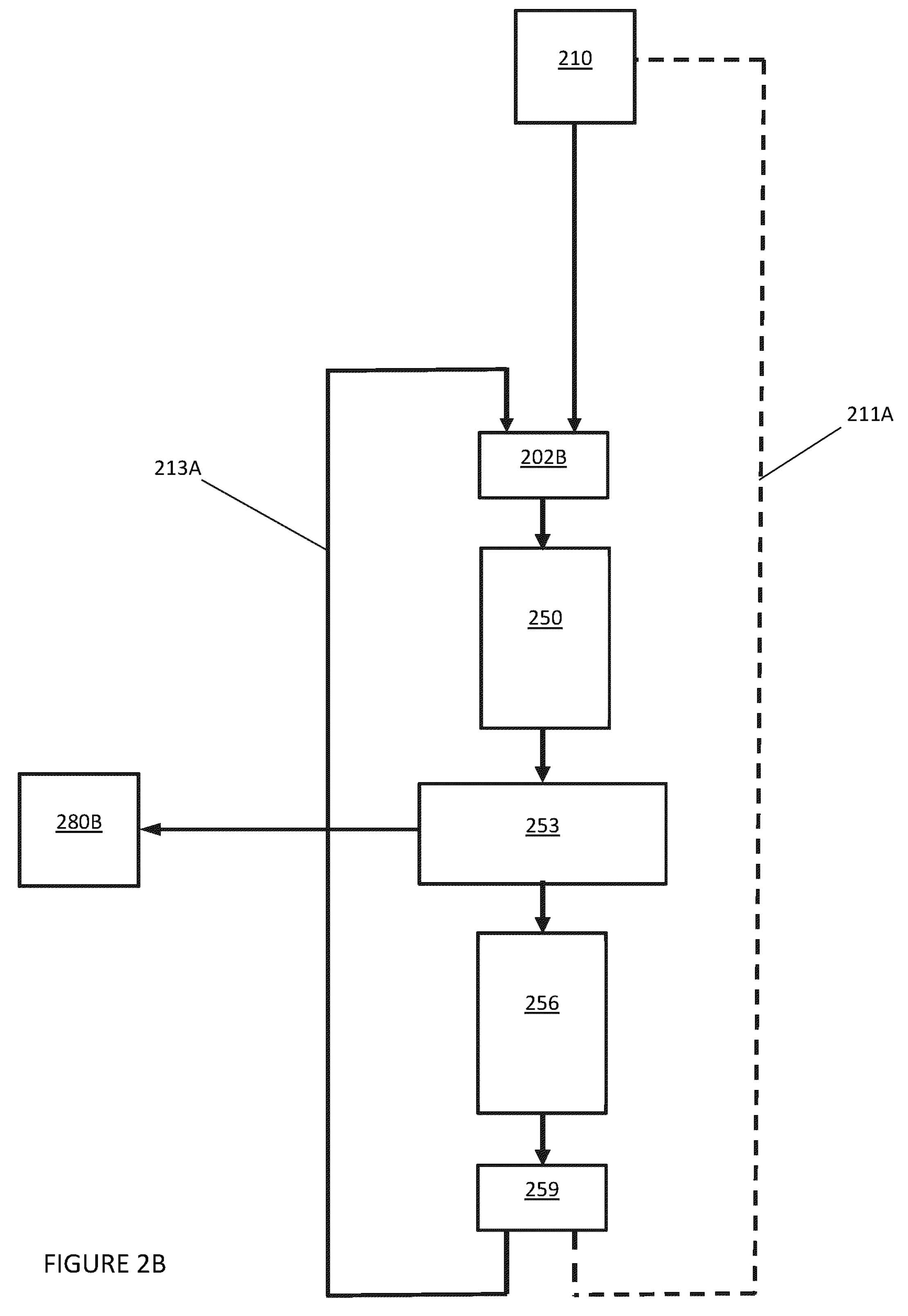
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
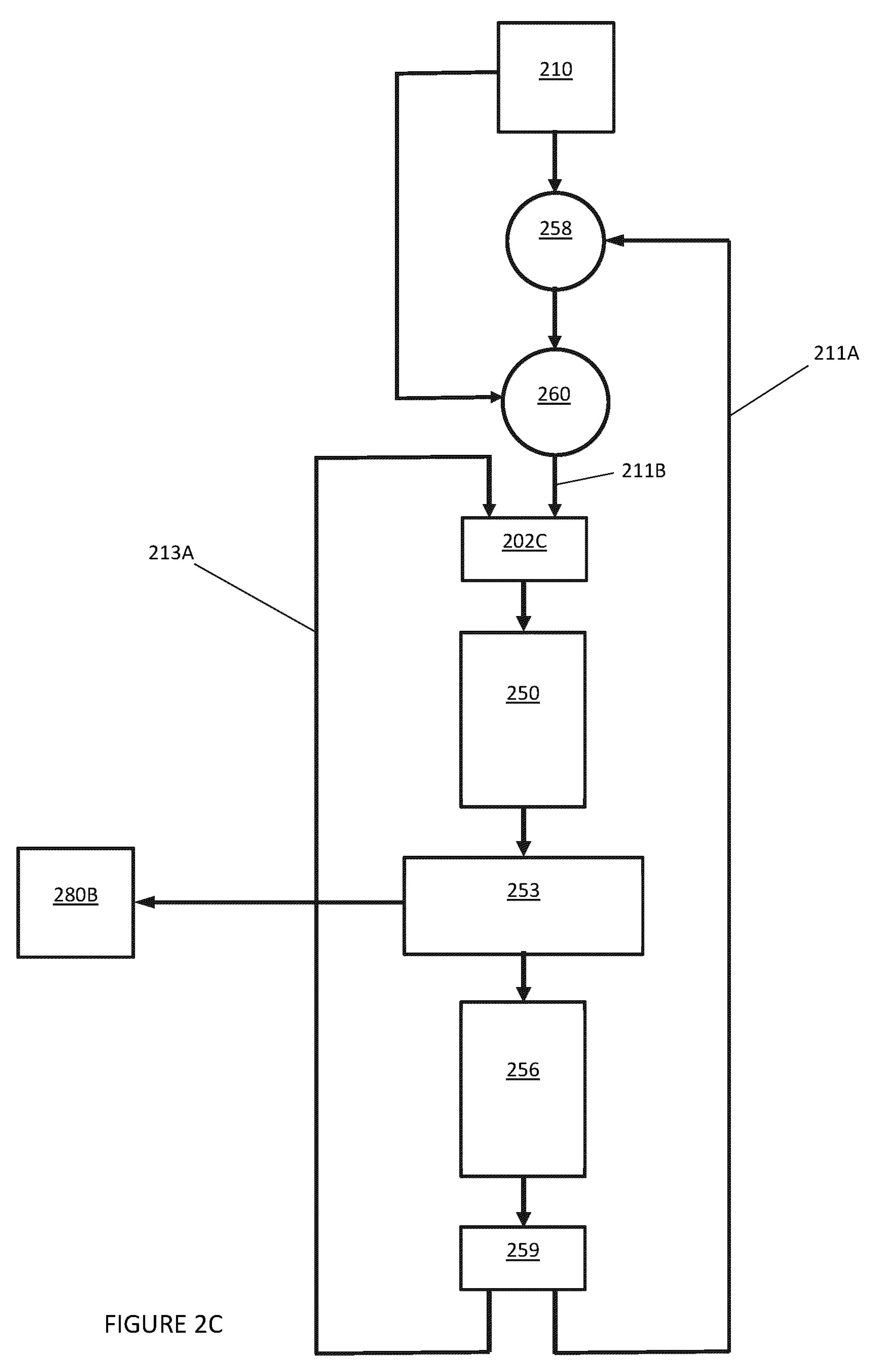
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. It may be said that the data written to the spatial light modulator comprises a diffractive pattern combining a hologram and a lensing function. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. It may be said that the data written to the spatial light modulator comprises a diffractive pattern combining a hologram and a grating function. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
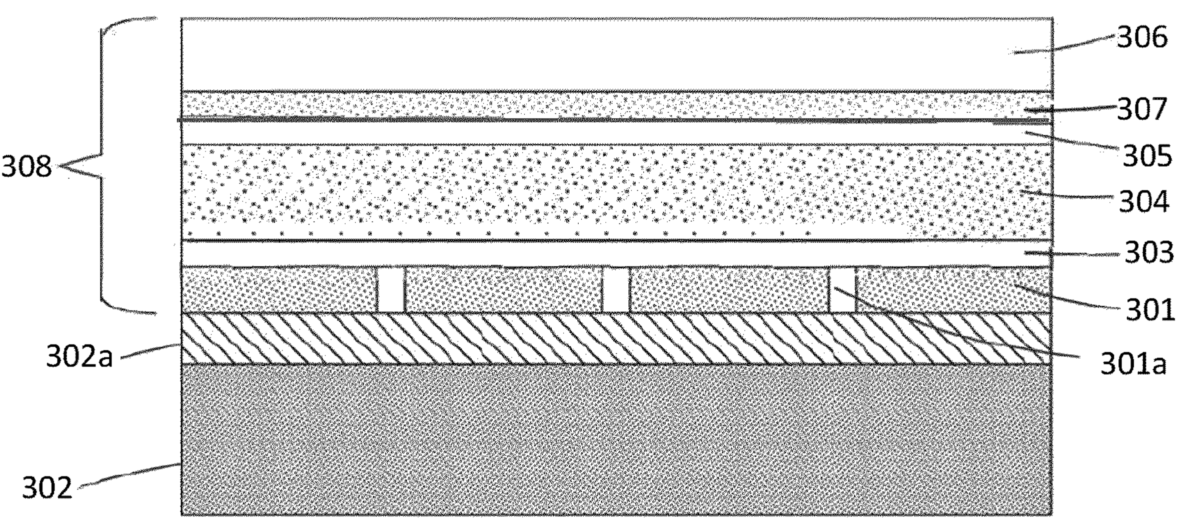
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Zone Scanning

Various methods for providing improved image quality and head-up displays using a holographic projector have been previously disclosed. It has also been recognised that a holographic projector can be used for LIDAR. WO 2018/134618 discloses a scanning LIDAR system in which a variable grating function (instead of physical optics such as a rotatable prism) is used to move a holographic replay field so as to perform a continuous scan of a light footprint across a scene. WO 2019/224052 discloses a structured light LIDAR system in which a structured light pattern is changed with each projection event by continually changing the hologram to scan a scene. The present disclosure relates to further improvements in a holographic-based LIDAR system in which a plurality of sub-areas or zones of a scene are scanned at the same time by scanning a structured light pattern comprising an array of light features. Notably, in distinction over WO 2019/224052, the present disclosure relates to an arrangement in which each sub-area of the scene, that is scanned by one respective light feature of the structured light pattern (or light footprint), contains a plurality of individual fields of view of the detection system. In some embodiments (e.g. FIG. 4), each light feature is one continuous area of light such as a single light spot. In other words, each light feature is one discrete area of light. In other embodiments, each light feature comprises a plurality of discrete light spots. In some embodiments, each light feature is a line of light or a plurality of parallel lines of light (e.g. FIG. 5 shows three parallel scanning lines). For the avoidance of doubt, each light feature (or light feature component) may be formed of a plurality of image pixels.

Each light feature scans its entire sub-area during the scan. Typically, no part of the sub-area is illuminated twice—i.e. no part of each sub-area is "double-exposed" (or exposed more than once) during the scan. The reader will understand how the size and shape of the light feature in each sub-area may be configured to achieve scanning of its entire sub-area without double-exposure. In some embodiments, the scan is a 2D scan in x and y, wherein the plane containing the light footprint (at all times during the scan) is the x-y plane. In other embodiments, the scan is a 1D scan in x or y.

Figure 4:
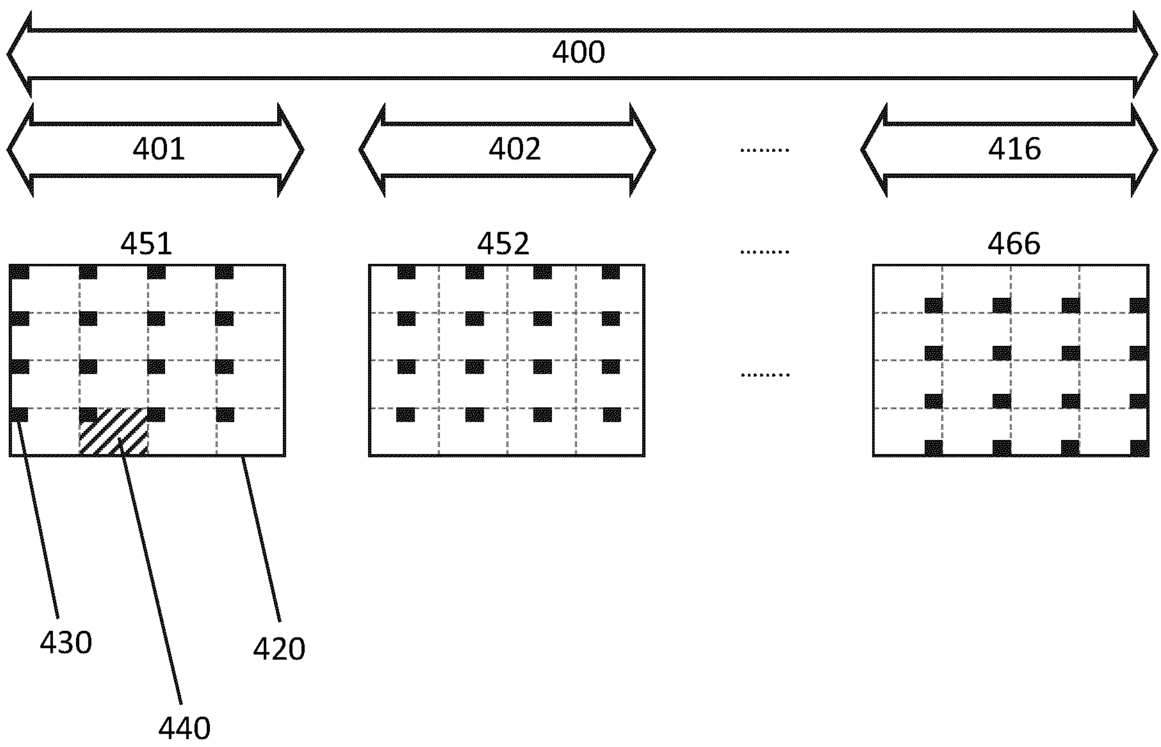
FIG. 4 shows a temporal sequence of example light footprints for surveying a scene in accordance with embodiments.
Figure 5:
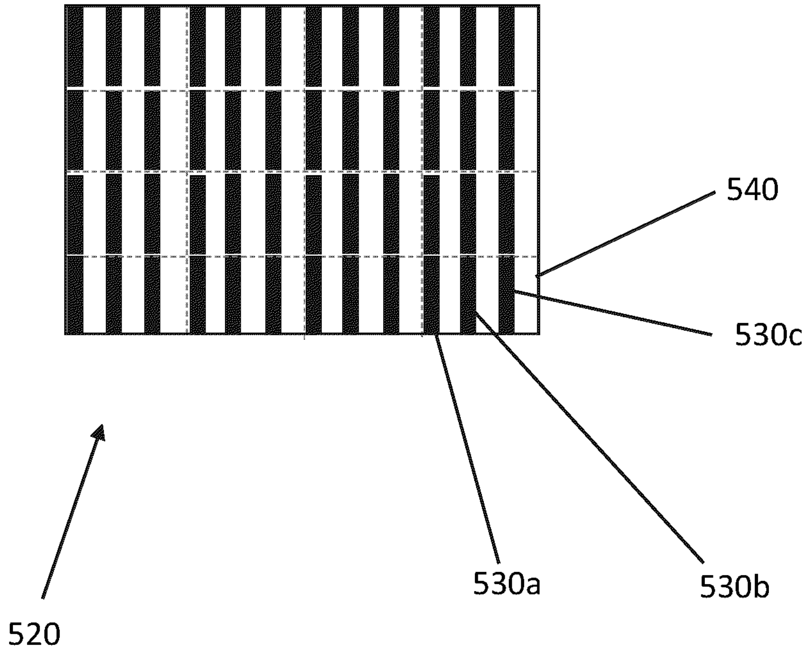
FIG. 5 shows another example light footprint in accordance with further embodiments.

FIG. 4 shows a temporal sequence comprising a plurality of light footprints, which may be formed by a holographic projector for LIDAR scanning of a scene, in accordance with embodiments of the present disclosure. The footprints are illustrated from the point of the view of the light detector, and thus correspond to the field of view of the detector. In this embodiment, each light feature is a single light spot having a quadrilateral shape and 2D scanning is performed.

In particular, a sequence of sixteen light footprints is shown in FIG. 4 comprising a first light footprint 451 formed during a first time interval 401 of a total scan time 400, a second light footprint 452 formed during a second time interval 402 of the scan time 400 and so on until a final, sixteenth light footprint 466 formed during a sixteenth time interval 416 of the scan time 400. As the skilled person will appreciate, the third to fifteenth light footprints are not shown in FIG. 4 for ease of illustration. Each light footprint comprises sixteen light spots such as light spot 430 of first light footprint 451. As described above, each light footprint is formed in the (zero order) replay field by a "display event". A display event comprises the display of a diffractive pattern on a spatial light modulator, and the illumination of the spatial light modulator so as to form a holographic reconstruction of the light footprint. The light footprint is projected onto the scene optionally using a projection lens. Thus, each display event corresponds to a "projection event".

In accordance with the present disclosure, the scene to be surveyed by LIDAR (i.e. field of view) is divided into a plurality of sub areas, such as quadrilateral sub areas. The sub-areas shown in the figures correspond to the illumination at a single plane within the field. i.e. the sub-areas correspond to solid-angles starting at the replay field. In embodiments, the sub areas are substantially non-overlapping. Typically, the sub areas are contiguous. The plurality of sub areas may form a substantially continuous area of the scene. It will be appreciated that, in embodiments in which the holographic reconstruction is formed on the replay plane and then projected onto the scene, the replay plane is similarly divided into a corresponding plurality of sub areas. Thus, whilst the description generally uses the term "sub area" to refer to sub areas of the scene (i.e. field of view of the detection system), it may also refer to the corresponding sub area of the replay plane on which the holographic reconstruction is formed. Notably, the positions of the sub areas are fixed on the replay plane, and thus within the scene, throughout the scan. In accordance with the present disclosure, a part of the area of each of the plurality of sub areas is illuminated by a light feature of the projected light footprint at the same time.

In the embodiment of FIG. 4, each light feature (of the array of light features) is a single light spot that is scanned in the x and y-direction.

FIG. 4 shows one example light footprint, suitable for surveying a scene that is divided into a plurality of contiguous, quadrilateral sub areas, in accordance with the present disclosure. The example light footprint comprises a regular or ordered array of rows and columns of light spots 430. In particular, the array comprises individual discrete light spots 430 having a quadrilateral shape that are spatially separated from each other, and are formed at regular or periodic intervals in the x and y directions on the holographic replay plane, and thus in the scene. Each light spot 430 is formed in a respective zone or sub area 440 of the surveyed scene 420. In this embodiment, each sub-area comprises one light spot. It may be said that each sub area receives light of one light spot 430. In this embodiment, each light spot 430 is arranged to scan its corresponding individual sub area 440, as described further below. Whilst the example light footprint forms only a single light spot 430 in each individual sub area 440, this is not essential. Other example light footprints may form more than one light spot in each sub area, or contiguous groups of light spots forming larger features such as horizontal or vertical lines of light, as will be appreciated from further example light footprints described below.

In the example light footprint of FIG. 4, each light spot 430 of the array of light spots is spatially separated from adjacent light spots in the same row by a distance corresponding to the dimension of the sub area 440 in the x direction. Similarly, each light spot 430 of the array of light spots is spatially separated from adjacent light spots in the same column by a distance corresponding to the dimension of the sub area 440 in they direction. Thus, each light spot 430 in the array of light spots of the light footprint is formed at substantially the same position within its respective sub-area 440. It may be said that each light spot 430 of the array of light spots is formed at the same relative position within its respective sub area 440. For instance, in the first light footprint 451 of the sequence, each light spot 430 is formed in the top left-hand corner of its corresponding sub area 440, whilst in the last light footprint 466 in the sequence, each light spot 430 is formed in the bottom right-hand corner of its corresponding sub area 440.

In addition, in the example light footprint of FIG. 4, the size of each light spot 430 formed in the scene corresponds to a defined proportion or fraction of the size of the sub area 440 of the scene. In particular, each light spot 430 illuminates 1/n (or at least 1/n) of the total size of the sub area 440. It may be said that the area of the quadrilateral light spot 430 is 1/n of the area of the quadrilateral sub area 440. The total sub area 440 can be scanned by a sequence of n contiguous positions of the corresponding light spot 430. In the example illustrated n=16. Thus, each light spot 430 illuminates one sixteenth of the area of its respective sub area 440, and is moved to sixteen contiguous scanning positions thereof. In the sequence of light footprints shown in FIG. 4, each light spot 430 in the array of light spots of the light footprint is moved through a sequence of contiguous scanning positions within its respective sub-area 440 in raster scan order, from the top left-hand corner to the bottom right-hand corner. Thus, since each sub area 440 of the scene 420 is illuminated by a respective light spot 430 at the same time, it is possible to scan the entire area of the scene 420 by the temporal sequence of sixteen light footprints of FIG. 4. Thus, the total scan can be completed in the scanning time 400 comprising 16 display/projection events or frame intervals 451, 452 to 466.

FIG. 5 shows another example light footprint, suitable for surveying a scene that is divided into a plurality of contiguous, quadrilateral sub areas, in accordance with the present disclosure. In the embodiment of FIG. 5, each light feature (of the array of light features) is three parallel, vertical scanning lines that are scanned, as a group, in the x-direction only.

The example light footprint 520 comprises a regular or ordered array of three scanning lines. That is, each light feature comprises three scanning lines, which are spatially separated and parallel to each other. Each scanning line has a dimension equal in size to the corresponding dimension of a sub-area. In the embodiment of FIG. 5, the height (size in the y-direction) of each scanning line is equal to the height (size in the y-direction) of each sub-area. Each sub-area is simultaneously scanned by its three scanning lines. The three scanning lines of each sub-area collectively scan each part of their sub-area only once (i.e. without double-exposing any parts of the sub-area). In the example shown in FIG. 5, the pattern of light features is arranged to form first, second and third scanning lines 530*a*, 530*b*, 530*c* in each respective sub area 540 of the scene. For example, each scanning line 530*a*, 530*b*, 530*c* may comprise a column of four adjacent light spots of FIG. 4 so as to form a vertical scanning line. As described herein, each light spot may comprise multiple image pixels, and so each scanning line may be more than one image pixel wide. Each first vertical scanning line 530*a* is spatially separated from the second vertical scanning line 530*b* in the respective sub area 540. Each second vertical scanning lines 530*b* is spatially separated from the third vertical scanning lines 530*c* in the respective sub-area 540. The first, second and third scanning lines 530*a*, 530*b*, 530*c* are formed in an ordered array, that is at periodic intervals in the x and y directions on the holographic replay plane, and thus in the scene, so as to form the first, second and third scanning lines 530*a*, 530*b*, 530*c* at the same relative position in each sub area 540. Thus, each first/second/third scanning line is spatially separated from adjacent first/second/third scanning lines in the same row. However, there is substantially no spatial separation in the y direction between each first/second/third scanning line 530 in the same column. Each light feature comprising a group of first, second and third scanning lines 530*a*, 530*b*, 530*c* is formed in a respective sub area 540 of the surveyed scene. It may be said that there is a one to one correspondence between each first, second and third scanning lines 530*a*, 530*b*, 530*c* and an individual sub area 540 of the scene. This is because each group of scanning lines 530*a*, 530*b*, 530*c* is arranged to scan its corresponding individual sub area 540, as described further below. As the skilled person will appreciate, in this example light footprint, a pattern of a plurality of light spots may be arranged to form the group of scanning lines 530*a*, 530*b*, 530*c* in each individual sub area 540.

In some embodiments, m scanning lines are used to scan each sub-area and the separation between adjacent scanning lines in each sub-area is equal to the sub-area dimension divided by m.

As the skilled person will appreciate, a temporal sequence of light footprints in accordance with the example light footprint 520 of FIG. 5 may be formed (and projected) so that each light feature comprising a group of three scanning lines 530*a*, 530*b*, 530*c* scans its respective sub area 540. Since each light footprint scans all of the sub areas 540 of the scene at the same time, the sequence of light footprints will scan the entire scene. As the skilled person will further appreciate, the use of scanning lines in the example of FIG. 5, instead of discrete light spots as in the example of FIG. 4, requires fewer display events in the temporal sequence in order to scan the entire scene. Thus, the scan time will be reduced. Other examples light footprints may use a single scanning line provided by forming a single column of light spots in each sub area, or may use one or more horizontal scanning lines provided by forming one or more rows of light spots in each sub area. In the case of one or more horizontal scanning lines, there is substantially no spatial separation in the x direction between each scanning line in the same row.

In an embodiment, each scanning line is one image pixel wide (x-direction for vertical scanning line) and there are many scanning lines in each sub-area. For example, there may be more than 20 scanning lines per sub-area—such as 32 scanning lines per sub-area—and adjacent scanning lines of a sub-area may be separated by less than 12 image pixels—such as 4 image pixels. In other embodiments, each light feature/sub-area comprises a plurality of light spots, wherein each light spot comprises only one image pixel. That is, each light spot is formed of only one image pixel. The single image pixel light spots of each sub-area may be separated in x and y by e.g. 2 to 8 pixels such as 4 pixels.

These schemes are advantageous because they require only very small grating functions to cover the entire sub-areas (e.g. +/−2 image pixels) and the entire scene is therefore coarsely mapped (i.e. no unscanned regions) in a short period of time (total scan time). Notably, this may be done using a relatively low-resolution hologram.

In accordance with the present disclosure, the LIDAR system comprises a display driver (or equivalent system controller) arranged to control the spatial light modulator of the holographic projector. The display driver is arranged to change the diffractive pattern displayed by the spatial light modulator with time. In particular, the diffractive pattern may be changed with time to form a temporal sequence of light footprints in order to scan the scene. In addition, the LIDAR system comprises a detection system comprising a plurality of light detection elements arranged to detect light reflected from the scene. The detected light may be processed by the detection system to determine time of flight measurements, identify features of the scene from the reflected light and the like, as known in the art.

In some implementations, the detection system comprises a light detector array. In some examples, the plurality of light detection elements comprises a charge-coupled device (CCD) camera, wherein each light detection element is an individual CCD of an array of CCD elements. In other examples, the plurality of light detection elements comprises a single-photon avalanche diode (SPAD) array, wherein each light detection element is a SPAD element of an array of SPAD elements. Any other suitable form of photodetector comprising an array of light sensing elements is possible and contemplated.

In accordance with the present disclosure, the detection system is arranged such that each light detection element detects light from a respective individual field of view ("IFOV") within the surveyed scene (i.e. overall field of view of the detector). Each light detecting element of the detection system is able to receive light from a defined (fixed) area of the scene, corresponding to the field of view thereof. Thus, each individual light detection element has a corresponding IFOV. The array of light detecting elements is typically static during a scan of a field of view of the LIDAR system.

As discussed above, the scene is divided into an array of sub areas, typically a contiguous array of quadrilateral sub areas, that are individually scanned at the same time by forming a temporal sequence of light footprints in the scene. Notably, in accordance with embodiments of the present disclosure, each sub area of the scene contains a plurality of IFOVs of the light detection elements. Thus, each IFOV of a light detection element corresponds to (i.e. is arranged to receive light from) only a part of a sub area of the scene. Thus, a sub-array of the plurality of light detection elements corresponds to (i.e. can receive light from) each sub area of the scene. Light reflected from a scene, which is illuminated by the array of light features of a light footprint of a temporal sequence of light footprints, will be detected by only a subset of the plurality of light detection elements at a time. In particular, light detection elements will detect reflected light from the scene when the array of light features of the light footprint illuminates (i.e. projects light within) an area corresponding to its IFOV. Conversely, light detection elements will not detect reflected light from the scene when the array of light features of the light footprint does not illuminate an area corresponding to its IFOV. In accordance with embodiments, since each successive light footprint of the temporal sequence of projected light footprints illuminates different parts of the sub areas of the scene, a different subset of light detection elements will detect reflected light during successive light detection intervals (i.e. exposure times). This may mitigate the problem of saturation of the light detection elements, by providing recovery time for a light detection element after saturation occurs.

In some implementations, the IFOV of each light detection element may correspond to a single light feature—typically a light spot—formed in a sub area of the scene. In this case, it may be said that there is a one to one correlation between each light spot of an array of light spots of a light footprint and a light detection element.

For example, in implementations using the sequence of light footprints of FIG. 4, in which each light spot 430 illuminates 1/n of the respective sub area 440 of the scene, the IFOV of each light detecting element corresponds to 1/n of the sub area 440 of the scene. Thus, each sub area 440 of the scene correlates to a sub-array of n light detecting elements of a detector array, for example. In the example shown in FIG. 4, where n=16, the scene comprises 16 quadrilateral sub areas, which correlates to n×n light detecting elements in the detector array (i.e. 16×16=256 light detecting elements). Accordingly, during each display/projection event forming an array of n discrete light spots in the scene, in accordance with one of the sequence of the light footprints shown in FIG. 4, n of the light detecting elements (i.e. 16 light detecting elements) of the detector array will receive reflected light at the same time, whilst the remaining (n−1)×n light detecting elements (i.e. 15×16=240 light detecting elements) will not detect any reflected light (since their IFOVs are not illuminated). Thus, only a (spatially separated) subset of the array of light detecting elements, in particular 1/n of the total number of light detecting elements, will detect reflected light at any point in time. In addition, during each consecutive display event forming a respective light footprint of the sequence of light footprints, a different subset of the array of light detecting elements will detect reflected light. Thus, using the example sequence of light footprints shown in FIG. 4, an individual light detecting element will receive light every 16 display events, thereby allowing sufficient recovery time in the case of saturation of the light detecting element.

Similarly, in example implementations using the light footprint of FIG. 5, each light spot of a column of light spots forming a scanning line 530*a*, 530*b*, 530*c* may correspond to an IFOV of a light detecting element. In this example, a subset (comprising three spatially separate columns) of light detecting elements of a detector array may receive reflected light from the scene at the same time. For example, each scanning line may comprise a column of 4 light spots, so that corresponding columns of 4 light detecting elements of the array detector may receive reflected light from respective sub areas of the scene at the same time. However, a different subset (corresponding to different columns) of light detecting elements will receive reflected light from the scene during consecutive display/projection events forming a respective light footprint of the temporal sequence of light footprints for scanning the scene.

In example implementations, the size of each sub area of the scene is chosen so that the size of the corresponding area at the exit window of the LIDAR system is greater than 7 mm aperture diameter. More precisely, a 7 mm circle can be fitted within each sub-area at all positions from the exit aperture to the plane of interest in the scene. The 7 mm aperture size corresponds to the size of the human iris and so is used to ensure compliance with eye safety requirements in laser-based applications. In particular, eye safety requirements typically define a maximum power level threshold of laser light allowable for a 7 mm aperture size—typically about 1.0 mW for laser light wavelength of 905 nm. Accordingly, by matching the size of the sub area to be equal to or larger than the 7 mm aperture diameter, it is possible to control the power of the light spot(s) illuminating each sub area within the scene so that the power level is below a threshold for safety requirements whilst at the same time delivering multiple times the eye safe limit into the scene.

FIGS. 6A-6D show another example temporal sequence comprising a plurality of light footprints, which may be formed by a holographic projector for LIDAR scanning of a scene, in accordance with the present disclosure.

The sequence of light footprints shown in FIGS. 6A-6D uses the same example light footprint as in FIG. 4, comprising a regular array of rows and columns of discrete light spots having a quadrilateral shape. Thus, the sequence is suitable for surveying a scene 600 that is divided into a plurality of contiguous, quadrilateral sub areas 650. Accordingly, each light spot is formed in a respective sub area 650 of the surveyed scene 600. In particular, a single light spot in formed (projected) in each individual sub area 650 of the scene for scanning thereof. The plurality of sub areas of the scene can be individually scanned at the same time by respective light spots formed at the same relative position within each sub area. FIGS. 6A-6D show the first four light footprints in a temporal sequence of 16 light footprints arranged to fully scan the scene (since the number of light spot/scanning positions within a sub area n=16).

However, in contrast to the temporal sequence of light footprints shown in FIG. 4, the scanning of each sub area is not performed in raster scan order. Instead, in the temporal sequence of 16 light footprints of FIG. 6A-6D, each successive light footprint forms a light spot in one of the 16 contiguous scanning positions within its respective sub area in a defined order to provide a patterned scan. As mentioned previously, a patterned scan comprises a sequence of different positions of the light spots within their respective sub areas, in a random or semi-random order or in a defined (temporal) pattern or order, such that regions of the sub areas of the scene having a defined/minimum size do not remain without illumination for more than a threshold period of time. In some applications there may be a requirement that regions of a sub area of the scene of a certain minimum size (e.g. greater than a threshold such as greater than 20%) should not remain without illumination for more than a threshold period of time (e.g. greater than a threshold number of display event time intervals or a threshold time). Regions that remain without illumination for such a long time period are referred to herein as "voids". As the skilled person will appreciate, when a single light spot scans its respective sub area in raster scan order, as in the sequence of FIG. 4, voids may be formed in certain regions of the scene. For example, a region in the lower right-hand corner of a sub area, that is a quarter of the size of the sub area, will not receive any light during the first to tenth light footprints in the sequence. Thus, a void in this region may occur for a time interval corresponding to the first ten display events out of a total of sixteen display events of the sequence (i.e. the void is present for ⅝ the of the total scanning time 400). This is undesirable, as information in the void may be lost or detected late. Accordingly, a patterned scan, in which the temporal sequence of light footprints is ordered to form the light spots positioned within the respective sub area in a random/semi random pattern or a defined pattern so as to prevent voids occurring e.g. to prevent a region (e.g. quarter of the sub area) remaining without illumination for a threshold number of consecutive display event/time intervals.

In the example patterned scan illustrated in FIGS. 6A-6D, each sub area is divided into four quarter-sized regions (herein "quarter regions"). In particular, the four quarter regions correspond to a first quarter region in the top left corner of the sub area, a second quarter region in the top right corner of the sub area, a third quarter region in the bottom left corner of the sub area and a fourth quarter region in the bottom right corner of the sub area. In addition, in this example, each consecutive light spot is formed in a different one of the four quarter regions of its respective sub area during scanning thereof using the patterned scan. As the skilled person will appreciate, other approaches are possible and contemplated.

FIGS. 6A-6D show an example area of the scene comprising a single illustrative sub area 650 and portions of neighbouring sub areas—specifically three neighbouring sub areas in the array of sub areas, which are respectively positioned to the right, below and below-right relative to the sub area 650. A first light footprint of the temporal sequence forms a first light spot 601 in the upper left-hand corner of each sub area 650 during a first display interval as shown in FIG. 6A. The position of first light spot 601 corresponds to the first position in the raster scan ordered sequence of FIG. 4. Thus, the first light footprint forms a light spot in the first quarter region as shown in FIG. 6A. FIG. 6A also shows light spots of the array of light spots formed at the same time in equivalent positions (the same relative position) within each of the three adjacent sub areas to the right, below and below-right of sub area 650. A second light footprint of the temporal sequence forms a second light spot 602 at a position in the fourth quarter of the sub area 650 during a second display interval as shown in FIG. 6B. A third light footprint of the temporal sequence forms a third light spot 603 at a position in the third quarter of the sub area 650 during a third display interval as shown in FIG. 6C. FIG. 6C also shows a light spot of the array of light spots formed at the same time in the equivalent position in the adjacent sub area to the right of sub area 650. A fourth display event of the temporal sequence forms a fourth light spot 602 at a position in the second quarter of the sub area 650 during a fourth display interval as shown in FIG. 6D. FIG. 6D also shows a light spot of the array of light spots formed at the same time in the equivalent position in the adjacent sub area below sub area 650. In each of FIGS. 6B, 6C, and 6D the positions of light spots formed by the preceding light footprint(s) of the temporal sequence are shown, in order to illustrate how the formation of voids, comprising regions without illumination over a number of display intervals/light footprints, is prevented. In particular, as shown in FIG. 6D, after the first four light footprints of the temporal sequence, the illuminated or probed areas are evenly distributed throughout the scene. This is achieved, in this example, by moving the light spot in random, semi random order or in a pattern, so as to be positioned in different ones of the four quarter regions of the sub area during successive light footprints of the sequence.

Accordingly, there is provided a method of light detection and ranging, "LIDAR", for surveying a scene. The method comprises dividing the scene into a plurality of sub areas. The method further comprises displaying a diffractive pattern comprising a hologram of a light footprint on a spatial light modulator. The light footprint comprises an array of light features, such as light spots. The method further comprises illuminating the diffractive pattern to form a holographic reconstruction of the light footprint on a holographic replay plane and projecting the reconstructed light footprint in the scene. The method further comprises controlling the spatial light modulator to change the diffractive pattern with time, such that each light feature of the regular array of light features scans a respective sub-area of the scene. The method further comprises detecting light by a plurality of light detecting elements, wherein each light detecting element is arranged to receive light from a respective individual field of view within the scene. The method comprises configuring the plurality of light detecting elements so that each sub-area of the scene contains a plurality of individual fields of view of the light detecting elements.

Power/Intensity Control in Individually Scanned Sub-Areas

In accordance with the present disclosure, prior to the start of a scan, the LIDAR system divides the scene (or field of view) into a plurality of sub areas for individual scanning at the same time. This enables control of the power, and thus the intensity of illumination, used for surveying different areas of the scene. As the skilled person will appreciate, the higher the power used for illumination the higher the range (i.e. the greater the distance that light can travel into the scene). In addition, for a particular range, the higher the power, the higher the intensity of illumination of, and thus the intensity of reflections from, the scene, leading to more sensitive and/or accurate measurements. Thus, the range, accuracy and/or sensitivity of scanning increase as the optical power employed is increased. For example, range may be roughly proportional to square root of the optical power employed.

Accordingly, in some embodiments, the power of the light features (e.g. light spot(s) or scanning line(s)) in each sub area of the scene is controlled based on a property/requirement of the corresponding part of the field of view. For example, light features formed in respective sub areas at the centre of the scene/field of view may require a higher power than light features formed in respective sub areas at the periphery of the scene/field of view. In particular, in automotive LIDAR scanning applications, regions "straight ahead" in the scene (centre of the field of view) require high power for long range scanning (e.g. to a far distance of the road ahead), whilst regions at the periphery of the scene (edges of the field of view), such as at high angles and/or off to the sides, may require lower power for shorter range scanning (e.g. to identify nearby objects such as signs or hazards at the side of the road).

Moreover, in some embodiments, the power of the light feature formed in each sub area is adjusted so that the reflected light detected by the light detecting elements does not have a wide dynamic range (intensity variation). In particular, it is desirable that the display events have a constant display interval (display time) and that each light detecting element has an associated exposure time (light sensing interval) that is also constant—known as a "global exposure time". It is important that light detecting elements do not suffer saturation (without adequate recovery time). According, in some embodiments the detection system monitors for saturation of light detecting elements during the temporal sequence of light footprints, and, if saturation is detected, provides a feedback signal to the holographic projector accordingly. The display driver is configured to change the hologram (e.g. recalculate the hologram) in order to reduce the optical power of the relevant light features when forming the subsequent light footprints of the temporal sequence. In particular, the optical power (light intensity) is reduced for those light features of the light footprint used for scanning the particular sub-areas for which the feedback signal indicates that a light detecting element, having an IFOV therein, was saturated.

In accordance with the present disclosure, it is possible to control, and dynamically adjust, the power of the individual light features of the array of light features of the light footprint by changing the hologram (e.g. recalculating the hologram—either in real time or retrieving a predetermined hologram from a database).

In embodiments, it is important that the maximum eye safe power within a given sub area is not exceeded. Optionally, optical power may be reduced in sub areas where high power is not needed for sensing—for example, in order to increase optical efficiency.

Moving Image Spots for LIDAR Scanning

As described above, in the examples of FIGS. 4, 5 and 6, the LIDAR scanning uses an illumination pattern comprising an array of light features, wherein each light feature is formed in, and performs scanning of, a respective sub area of the scene. This enables a plurality of sub areas of the scene to be scanned at the same time. Such scanning is achieved by forming a temporal sequence of light footprints in the scene. In particular, the sequence of light footprints may be formed by means of a corresponding temporal sequence of display events of a holographic projector, as described herein, wherein successive display events move or reposition the array of light spots of the light footprint in the scene.

In some embodiments, the temporal sequence of light footprints is formed by dynamically changing the hologram, which is written to and displayed on the spatial light modulator of the holographic projector, and, thus, holographically reconstructed on the replay plane. Again, the holographic reconstruction may be formed in the scene or the holographic reconstruction may be formed on a replay plane comprising an intermediate plane and a projection lens employed. In particular, a hologram may be calculated for each light footprint in the sequence (i.e. each different position of the array of light features) and sequentially written to a spatial light modulator at the start of each display event for forming the light footprint in the scene. The holograms may be calculated by a hologram engine and written to the spatial light modulator in real time. Alternatively, the holograms may be pre-calculated and stored in a database, and may be retrieved from the database and written to the spatial light modulator in real time.

In other embodiments, the temporal sequence of light footprints is formed by displaying the same hologram of the light footprint comprising an array of light features on the spatial light modulator of the holographic projector. Instead, the temporal sequence of light footprints is formed by spatially repositioning the light footprint on the replay plane, and, thus, spatially repositioning the array of light features of the light footprint forming the holographic reconstruction. This may be achieved by so-called "beam steering" or "image steering" techniques. In such embodiments, the diffractive pattern written to the spatial light modulator comprises a grating function (also known as a "software grating") combined with the hologram of the light footprint, as described above. The grating function determines the position of the replay field, and thus the light footprint, on the holographic replay plane. In particular, the diffractive pattern written to the spatial light modulator may include grating data—that is, data arranged to perform the function of a grating. It is known in the field of computer-generated holography how to calculate grating data and combine it with holographic data representative of an image. For example, a phase-only grating may be formed by modelling the phase delay caused by each point on the surface of a blazed grating. An amplitude-only holographic grating may be simply superimposed on an amplitude-only hologram representative of an image to provide angular steering of an amplitude-only hologram. Accordingly, each display event may comprise writing a diffractive pattern to the spatial light modulator comprising the same hologram data with different grating data, so as to move or reposition the holographic reconstruction of the projected light footprint in the scene, in order to form successive light footprints in the sequence. Thus, in these embodiments, it is possible to move the array of light features formed by the light footprint to multiple different positions, in order to scan all of the sub areas of the scene as described herein, by simply changing the grating function of the diffractive pattern (e.g. without changing the hologram of the light footprint). Such embodiments may be more efficient (e.g. faster—allowing less time between display events) than embodiments that change the diffractive pattern by changing the hologram of the light footprint.

Compensating for Non-Uniform Intensity of Holographic Reconstruction

In embodiments, the pixels of the spatial light modulator give rise an intensity envelope that can cause non-uniformities in the brightness across the replay plane that are not desired. In the absence of a countermeasure, the intensity envelope effectively determines the maximum brightness of image pixels formed at each point on the replay plane. The intensity envelope is non-uniform. In some embodiments, the pixels of the spatial light modulator are rectangular or square and the intensity envelope is a sinc function or, more specifically, a $\text{sinc}^2$ function. The intensity envelope may be a first $\text{sinc}^2$ function or profile in the x direction and a second $\text{sinc}^2$ function or profile in the y direction. In some cases, the centre (i.e. maximum) of the intensity envelope is on the optical axis of the array of pixels of the spatial light modulator. That is, a straight line extending perpendicularly from the surface of the array of pixels will intersect the replay plane at the centre of the intensity envelope. In a conventional configuration, the centre of the zero-order replay field is therefore inherently the brightest part of the holographic reconstruction. In consequence, for a hologram computed for uniform intensity at the replay field using a Gerchberg-Saxton based algorithm and in the absence of a grating function, light spots of a light footprint for LIDAR formed at the centre of the (zero order) replay field will have higher intensity than light spots of a light footprint formed at the periphery.

In some embodiments, the hologram is arranged to compensate for a non-uniform intensity envelope. More specifically, in some embodiments, the target image (light footprint) used to calculate the hologram is processed before hologram calculation to compensate for the non-uniform intensity envelope that will result from reconstruction.

In accordance with some embodiments, a grating function is used to translate the replay field on the replay plane. Whilst the grating function translates the replay field (e.g. array of light features), it does not translate the intensity envelope. The grating function may therefore cause the optical axis of the spatial light modulator and the projection axis of the holographic reconstruction to become misaligned. In other words, the point at which the projection axis intersects the replay plane may be translated on the replay plane with respect to the point at which the optical axis intersects the replay plane. The grating function therefore causes the optical axis and projection axis to become non-colinear.

For example, a since compensation function may be used to process a target image for projection prior to calculation of the hologram. However, non-uniformities in intensity owing to the intensity envelope are reintroduced if the projected light pattern is moved using a grating function. In other words, the compensation function used for one replay field position is unsuitable for other replay field positions. This is because the intensity envelope in the x and y directions is due to the structure of the spatial light modulator, specifically the pixel shape. Thus, the intensity envelope remains in the same position on the replay plane despite changes in the grating function to move the replay field to reposition the light footprint. In particular, if a hologram is calculated for the first light footprint, and the same hologram is used to form the second and subsequent light footprints in a temporal sequence of light footprints by varying a grating function, the (compensated) intensity of lights spots will not match the required compensation for the different grating positions relative to the intensity envelope. In consequence, intensity variations will arise. This is illustrated in FIG. 7.

Figure 7:
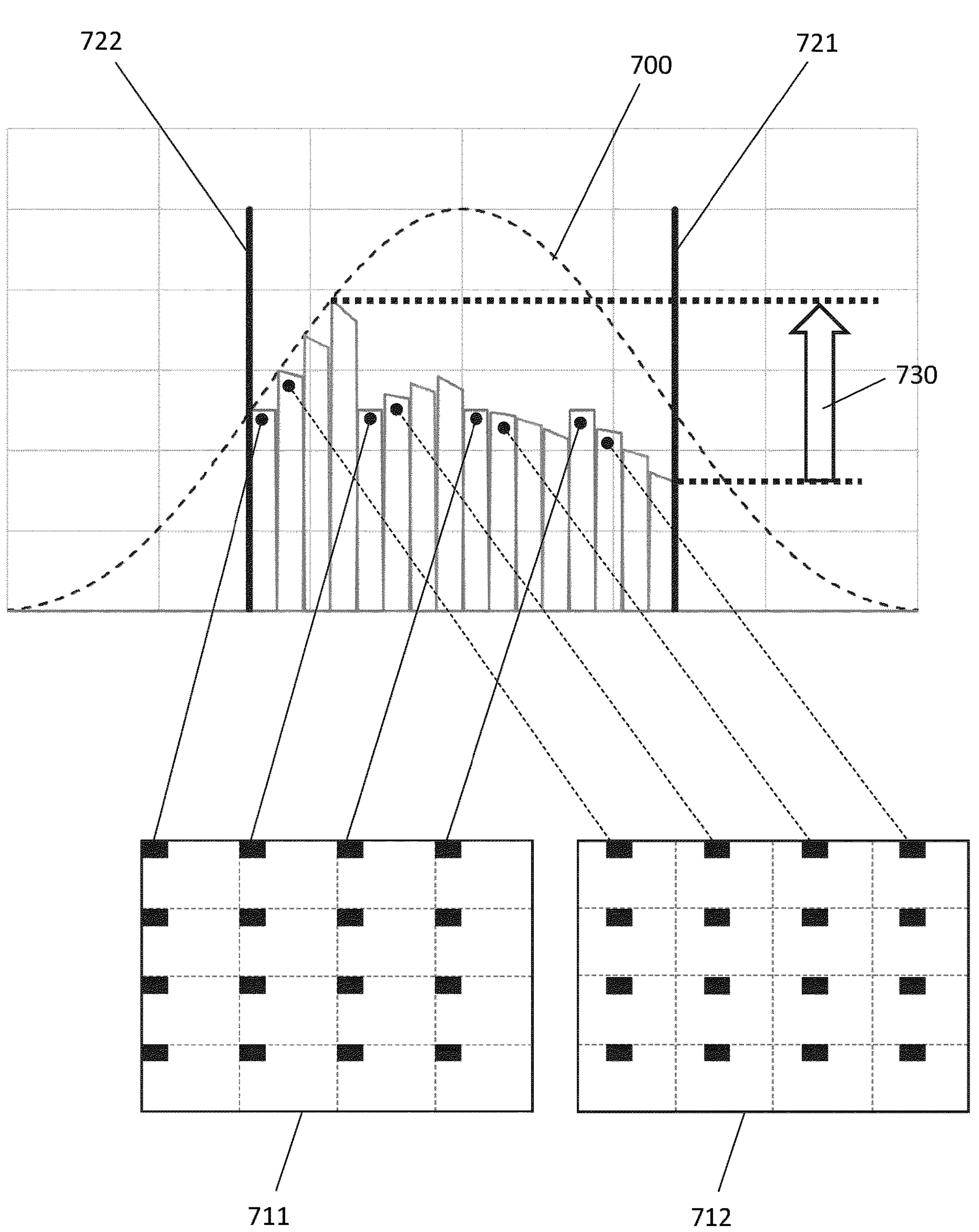
FIG. 7 shows an intensity distribution profile of the first row of light spots formed by the sequence of light footprints of FIG. 4 in accordance with a comparative example.

FIG. 7 (bottom) shows a sequence of light footprints 711, 712 comprising an array of light spots formed in accordance with the example light footprint of FIG. 4, in which the hologram is calculated by applying a $\text{sinc}^2$ compensation function to the first light footprint. The same hologram is then used for the subsequent light footprints in the temporal sequence. Note that as with previous Figures, light footprints 711, 712 are illustrated from the point of the view of the light detector, and thus shows the position of the light spots formed within respective sub areas of the surveyed scene, as described above. FIG. 7 (top) is a graph showing the resulting intensities of light spots. For ease of illustration, FIG. 7 shows the intensity distribution of the set of four light spots in respective sub areas of the first row of the array of light spots formed by each of the first four light footprints in the temporal sequence plotted against spatial position in the x direction of the replay plane. Each light spot is represented by a bar in the graph. FIG. 7 further shows the $\text{sinc}^2$ intensity envelope 700 and the edges 721, 722 of the surveyed scene (i.e. boundary of the field of view) in the x direction.

As illustrated in FIG. 7, the intensity distribution of the first set of four light spots formed by the first light footprint 711 (corresponding to the first, fifth, ninth and thirteenth bars in the graph) have substantially the same intensity value, due to compensation of the corresponding hologram in accordance with a $\text{sinc}^2$ compensation scheme. Notably, the intensity of each of the first set of four light spots is uniform across its area (which comprises multiple image pixels), as shown by the flat top of the corresponding bar. In other embodiments, each light spot is formed of only one image pixel. However, the intensity distribution of the second set of four light spots formed by the second light footprint 712 (corresponding to the second, sixth, tenth and fourteenth bars in the graph) varies, both from the intensity of the first set of light spots and from each other, due to their different positions on the replay plane and thus within the $\text{sinc}^2$ intensity envelope 700. In particular, the light spots in the respective first and second sub areas formed by the second light footprint 712 have higher intensity than when they are formed by the first light footprint 711, due to displacement thereof towards the centre of the $\text{sinc}^2$ intensity envelope 700. Conversely, the light spots in the respective third and fourth sub areas formed by the second light footprint 712 have lower intensity than when they are formed by the first light footprint 711, due to movement away from the centre of the $\text{sinc}^2$ intensity envelope 700. The same is true for the third and fourth sets of four light spots formed by the third and fourth light footprints (not shown). Notably, the intensity of each light spot of the second, third and fourth sets of four light spots is non-uniform across its area (i.e. the multiple image pixels have different intensities), as shown by the sloped top of the corresponding bar, since the conventional $sinc^2$ compensation technique does not compensate for the intensity variations associated with the different positions thereof. In consequence of this non-uniformity, the difference between the highest intensity and lowest intensity points of the light spots shown in FIG. 7 is relatively large, as shown by arrow 730 (the variation is approximately ×2.3).

Figure 8:
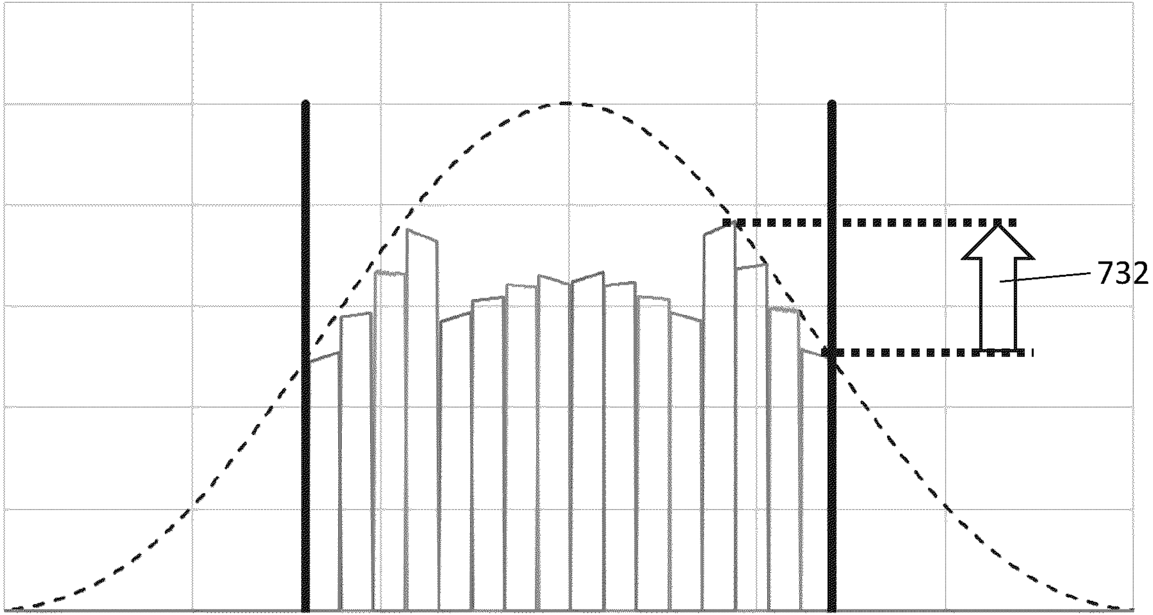
FIG. 8 shows the intensity distribution profile of the first row of light spots formed by the temporal sequence of light footprints of FIG. 4 in accordance with embodiments.

Accordingly, in some embodiments, the hologram is not calculated by applying the $sinc^2$ compensation function to the array of light spots positioned in accordance with the first light footprint 711 of the sequence because this gives rise to relatively large intensity variation during scanning as shown by arrow 730. Instead, in embodiments, the hologram is calculated after applying the $sinc^2$ compensation function to the target image when the light spots are positioned substantially in the middle of their respective sub-areas. This improvement is illustrated in FIG. 8. It can be seen from FIG. 8 that positive and negative grating functions are used to provide translation of each light spot from the middle of its respective sub-area to their relevant scanning positions therein according to the sequence of light footprints. In contrast, in FIG. 7, only a negative grating function is used to provide translation of each light spot from the top-left of its sub-area but an inferior result is achieved as shown by comparing arrow 730 with arrow 732.

In more detail, FIG. 8 shows the intensity distribution of a set of four light spots equivalent to FIG. 7, formed by a sequence of four light footprints equivalent to FIG. 7.

However, whilst the positions of the light spots are the same as in the sequence of light footprints of FIG. 7, the hologram for forming the sequence of light footprints is calculated using an optimisation technique.

Thus, as shown in FIG. 8, the first and second light spots of the first row of the array of light spots formed in the first and second sub-areas by the first, second, third and fourth light footprints (corresponding to the first eight bars of the graph) have successively increasing intensity distribution. The third and fourth light spots of the first row of the array of light spots formed in the third and fourth first sub areas by the first, second, third and fourth light footprints (corresponding to the last eight bars of the graph) have successively decreasing intensity distribution. In addition, the intensity of each light spot of the four sets of light spots is non-uniform across its area, as shown by the sloped top of the corresponding bar. Since the hologram is calculated to minimise the intensity variation of light spots for all footprints in the sequence, the difference between the highest intensity and lowest intensity points of the light spots shown in FIG. 8 is reduced, as shown by arrow 732 (the variation is approximately ×1.5). This ensures that the signal to noise ratio of the LIDAR detection is more uniform across the field of view.

In these optimised embodiments, each light spot of the target image (for hologram calculation) is $sinc^2$ compensated based on the middle of its sub-area. Furthermore, positive and negative gratings are used to translate each light spot from the centre of its sub-area in order to provide multiple zone scanning in accordance with this disclosure.

As the skilled person will appreciate, the above optimisation technique may be used in conjunction with any temporal sequence of light footprints, including sequences in raster scan, line scan, random, semi random or patterned order, as described herein.

In other embodiments, intensity variations are minimised across the field of view of the detector (surveyed scene) by minimising the magnitude of the grating changes during scanning. In particular, in embodiments that change the grating function of the diffractive pattern (e.g. grating data) displayed by the spatial light modulator in successive display events to form a sequence of light footprints to survey a scene, the grating changes should be small. This ensures that the $sinc^2$ compensation of the hologram used to form all the light footprints of the sequence is closer to ideal for all gratings used. At the same time, it may be advantageous to use as many grating values as possible because this increases the power at a given position in the scene during the measurement (and thereby the background light has less of a contribution to the measured data) because the optical energy directed to each feature of the replay field is dependent on the amount of image content. Therefore, an alternative and possibly advantageous light footprint pattern is a sparse grid of spots (e.g. distributed at 4× the angular separation between individual fields of view (IFOVs) in x and y) across the entire region of interest, then grating displacements are only to displace the spots to cover all IFOVs (e.g. 4 gratings in X and 4 gratings in Y where each grating change corresponds to the angle between IFOVs).

Figure 14A:
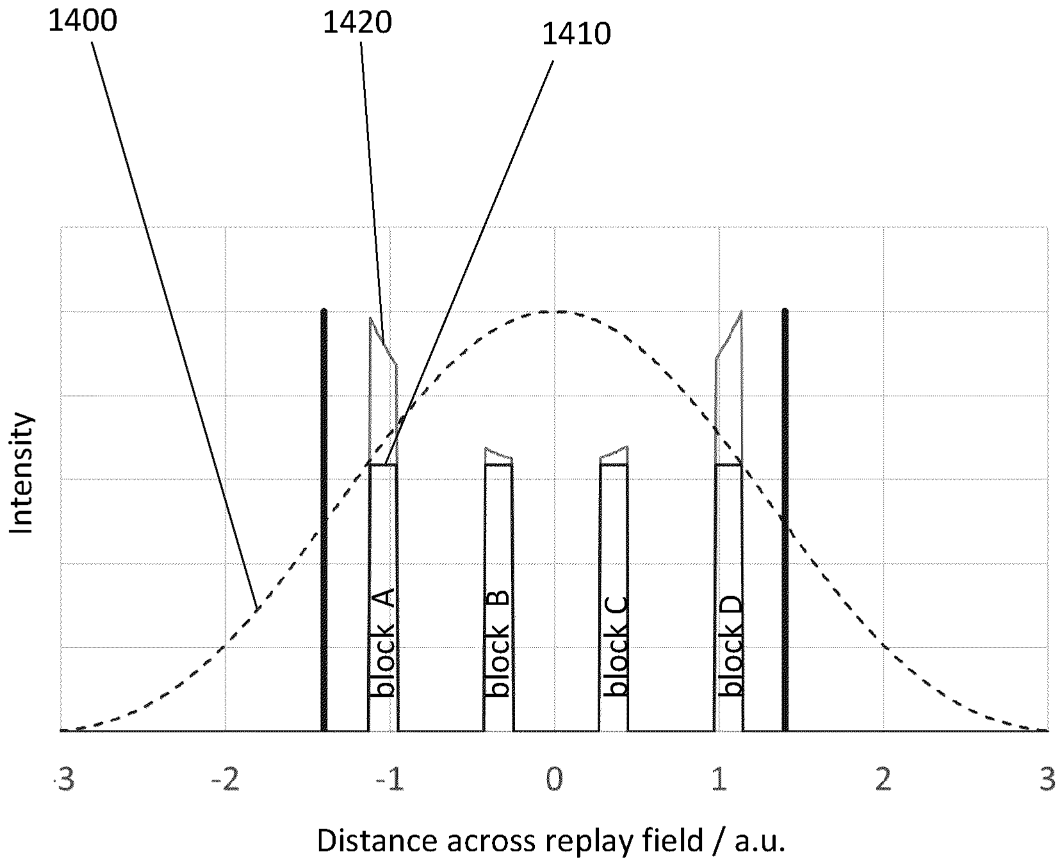
FIG. 14A shows the target and corresponding $\text{sinc}^2$ compensated intensity profiles of four light spots of a row of light spots formed in a light footprint comprising the array of light spots of FIG. 4 formed at a midpoint position in the x-direction within their respective sub area, in which the target intensities are the same.

Further improvements in uniformity across the centre of the field of view of the detector (surveyed scene) can be obtained by using different (i.e. non-uniform) target intensities of light spots in the respective sub areas. FIG. 14A shows, in black line, the target intensity values 1410 of four light spots in a first row of the array of light spots formed in respective sub areas by, for example, a hologram of a light footprint formed at a midpoint position between the second and third light footprints in the sequence of FIG. 4. In particular, each of the four illustrated light spots of the light footprint are positioned at a midpoint of the corresponding sub area in the x direction. FIG. 14A also shows the corresponding $sinc^2$ compensated value—e.g. first $sinc^2$ compensated value 1420 for block A—of that target intensity based on the different positions of the four light spots within the $sinc^2$ intensity envelope 1400 (shown by grey line). FIG. 14A shows the target light intensity 1410 for each light spot is the same, and is constant across its respective area as shown by the solid flat line at the top of the bar of each block A to D. The $sinc^2$ compensated intensity—e.g. first $sinc^2$ compensated value 1420 for block A—is significantly increased above the target intensity for each light spot formed in the outer or peripheral sub areas (first and fourth light spots), and is non uniform across its respective area as shown by sloped line at the top of the bar. However, the $sinc^2$ compensated intensity is only slightly increased above the target intensity 1410 for each light spot formed in the inner or central sub areas (second and third light spots), and is similarly non uniform across its respective area. Calculating a hologram based on the $sinc^2$ compensation intensity values of light spots for uniform target intensity values to form the sequence of first to fourth light footprints of FIG. 4 leads to a maximum intensity variation 1404A of approximately ±15% during scanning as shown by FIG. 14B which shows four scanning positions for each light spot.

In some embodiments, an alternative approach is used, in which the target intensity values for the light spots formed in respective inner or central sub areas of the scene are higher than the target intensities for the light spots formed in respective outer or peripheral sub areas of the scene. FIG. 14C shows an equivalent view to FIG. 14B, in accordance with this alternative embodiment. It can be seen the second light spot (corresponding to block B) and third light spot (corresponding to block C) that illuminate respective inner sub areas (in the x direction) have increased target intensity 1415 (and, in consequence, $sinc^2$ compensated intensity) compared to the target intensity 1410 of the first light spot (corresponding to block A) and fourth light spot (corresponding to block D) that illuminate respective outer sub areas (in the x direction). In particular, the target light intensity 1410 for the first light spot and fourth light spot is the same as the target intensity value for all light spots shown in FIG. 14A, whilst the target light intensity 1415 for the second light spot and third light spot is increased, as shown by the solid flat line at the top of each corresponding bar. Accordingly, the $sinc^2$ compensated intensity profile for the first light spot and fourth light spot is the same as that shown in FIG. 14A but the $sinc^2$ compensated intensity profile for the second light spot and third light spot is the increased above that shown in FIG. 14A, as shown by sloped line at the top of the bar. Calculating a hologram based on the $sinc^2$ compensation for non-uniform target intensities of light spots to form the sequence of first to fourth light footprints of FIG. 4 leads to the intensity variation during scanning as shown in FIG. 14D, in which the maximum variation 1404C is reduced to approximately ±8%. Notably, in this example, the intensity variation is improved (reduced) by increasing the intensity in the sub areas at the centre of the scene (in the x direction), which is generally desirable for LIDAR applications which require higher resolution at the centre of the scene. The embodiments of FIGS. 14A and B (with the same target intensities) and FIGS. 14C and D (with non-uniform target intensities) illustrate improvements in compensation for intensity variations of light features of the array of light features due to the first $sinc^2$ function of the intensity envelope in the x direction. As the skilled person will appreciate, the same technique may be implemented for improved compensation for intensity variations due to the second $sinc^2$ function of the intensity envelope in the y direction.

Figure 14B:
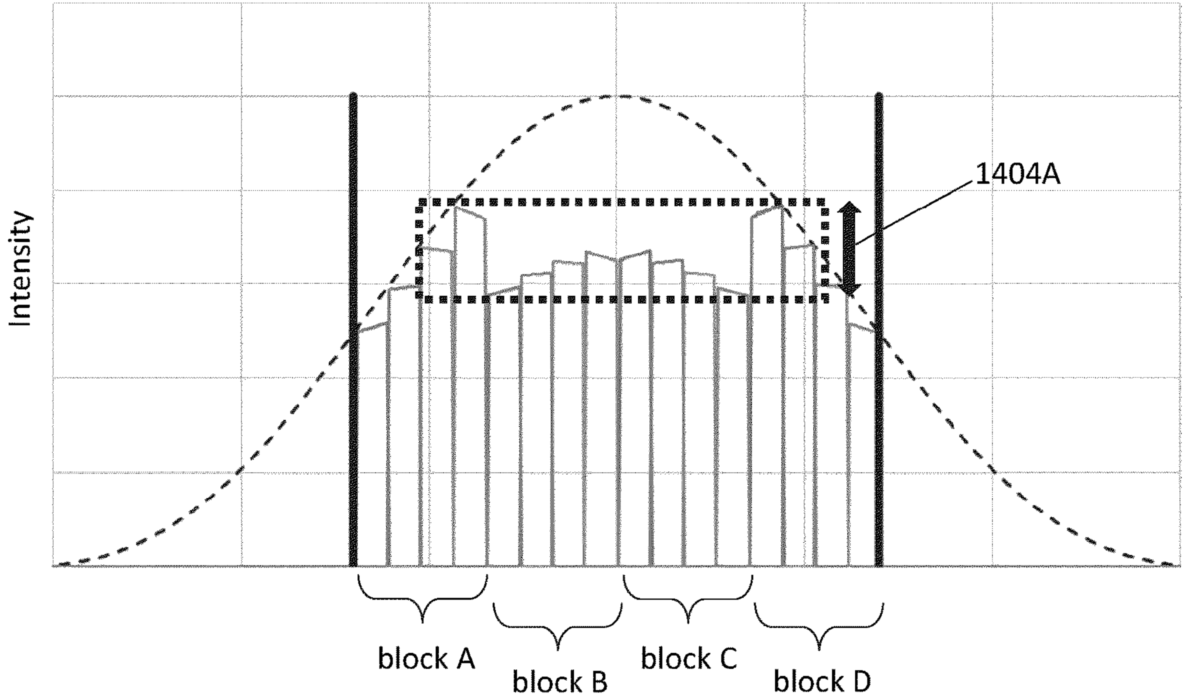
FIG. 14B shows the intensity distribution profile of the row of four light spots of FIG. 14A formed by a temporal sequence of first to fourth light footprints of FIG. 4 in accordance with embodiments.
Figure 14C:
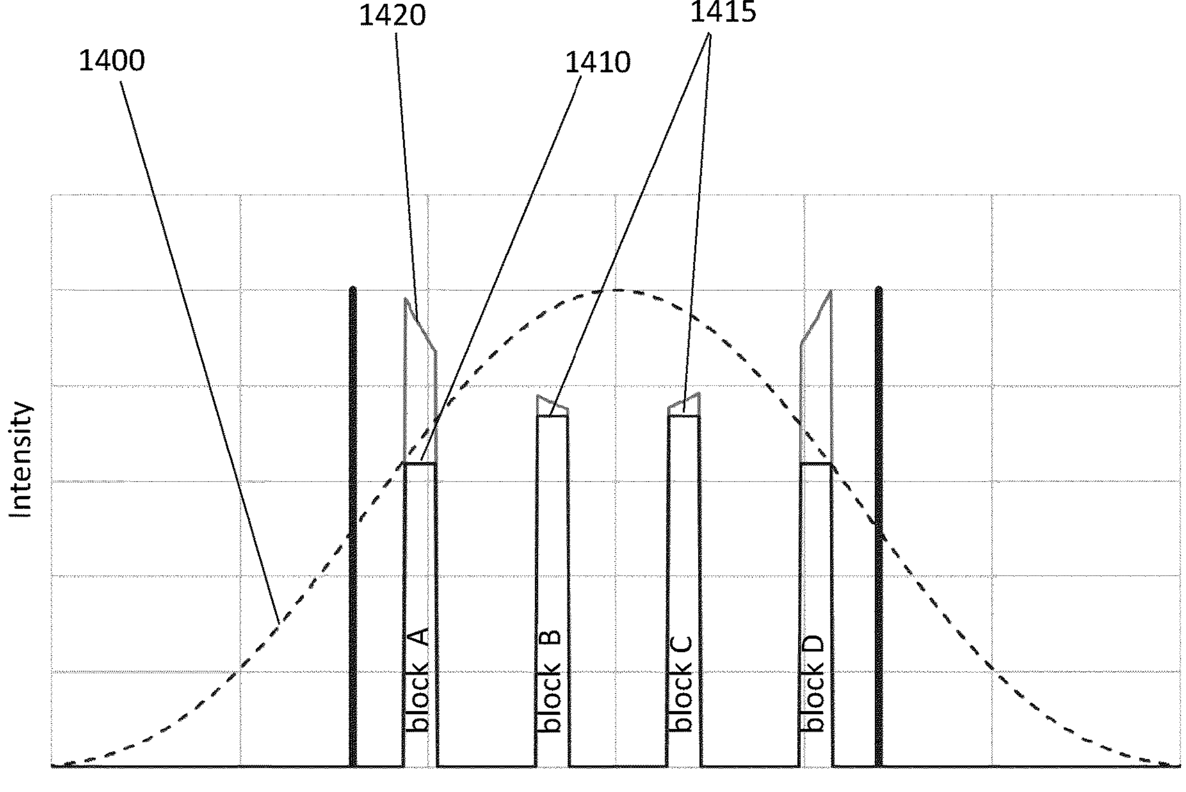
FIG. 14C shows the target and corresponding optimised $\text{sinc}^2$ compensated intensity profiles of a row of four light spots of a light footprint, equivalent to FIG. 14A, in which the target intensities are varied in accordance with embodiments.
Figure 14D:
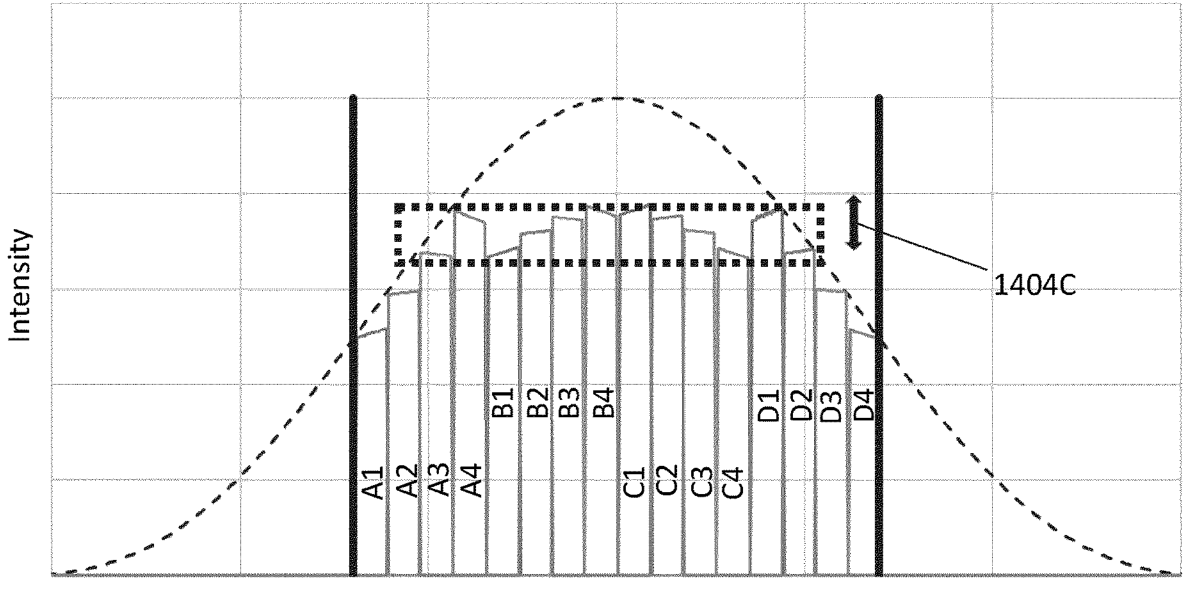
FIG. 14D shows the intensity distribution profile of the row of four light spots of FIG. 14C formed by a temporal sequence of first to fourth light footprints of FIG. 4 in accordance with embodiments.

Accordingly, by selecting target intensities for light spots of the light footprint for hologram calculation based on the position of the respective sub area in the surveyed scene, it is possible to substantially reduce the intensity variation of light spots (in particular, in the centre of the scene) for the light footprints in the sequence (e.g. when different gratings are applied to the same hologram) from ±15% to ±8% as shown in FIG. 14D compared to FIG. 14B. This effect of reducing the variation in intensity is surprising because one would usually expect use of non-uniform target intensities of light spots of a light footprint (holographic image) to reduce the overall uniformity.

In some examples, the selection of target intensity values of light spots for scanning the central sub areas of the surveyed scene can be set based on the intensity values of the light spots for scanning the outer sub areas for the grating positions that bring them adjacent to the central sub areas. Referring again to FIG. 14D, each light spot is labelled by a letter A, B, C or D that denotes the respective sub area A-D, together with a number 1, 2, 3 or 4 that denotes the number of the footprint, in the sequence of footprints 1-4, in which the light spot is formed. The intensities of light spots labelled A3, A4, D1, D2, which are formed in the outer sub areas A and D immediately adjacent the central sub areas B and C, may be used to select appropriate target intensities for the central sub areas (i.e. target intensities for the second and third sub areas B and C relative to the first and fourth sub areas A and D). As the skilled person will appreciate, suitable values will depend on the width of the relevant $sinc^2$ function and the number of sub areas.

Accordingly, the relative intensities of the light spots for scanning a sub area will depend on the intensities of neighbour/adjacent sub areas when combined with gratings, to provide for substantially uniform light spot intensities, or, alternatively, desired non-uniform light spots intensities according to application requirements.

For ease of description, the above examples concern compensation for non-uniformity of intensity arising from the intensity envelope in the x direction. As the skilled reader will appreciate, there is a corresponding intensity variation arising from the intensity envelope in the y direction. Thus, embodiments apply the above principles to compensate for intensity variation in both the x direction and the y direction.

Hybrid Replay Field Using Zero and First Order Diffracted Light

Figure 9:
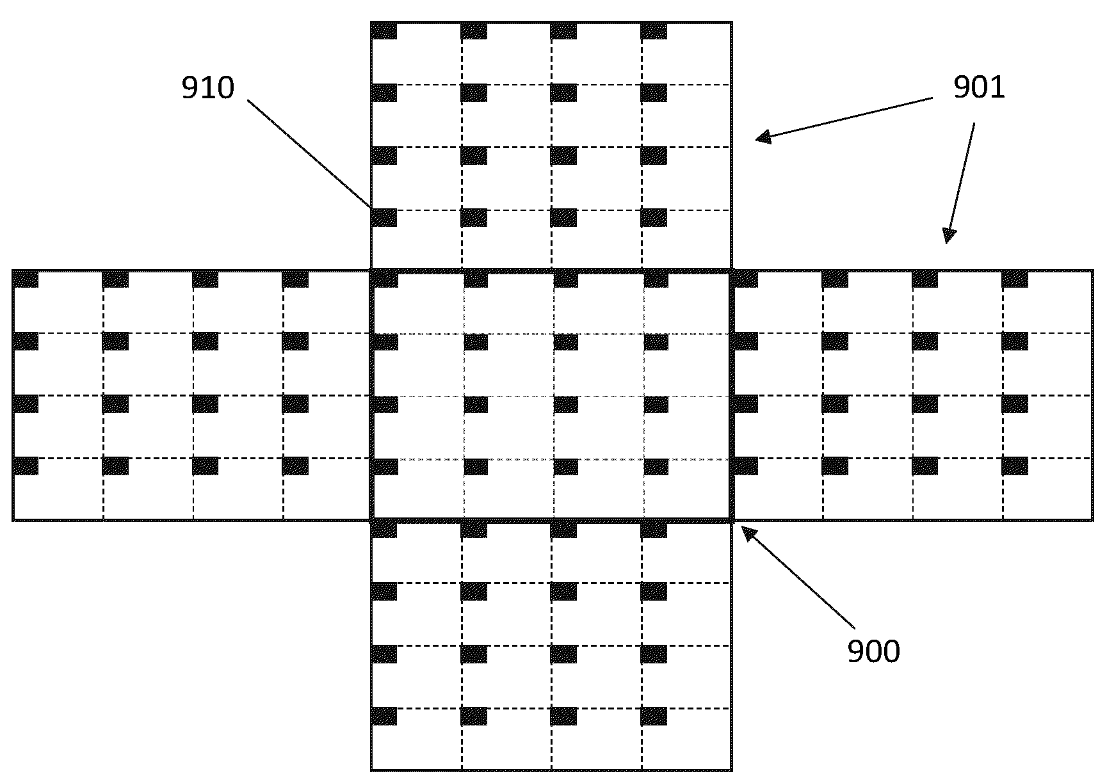
FIG. 9 shows the holographic reconstruction of the first light footprint of the sequence of light footprints of FIG. 4 formed in the zero and first order holographic replay fields on a replay plane.

A holographic reconstruction formed by a holographic projector may include higher-order duplicates of the zero-order replay field. This is shown in FIG. 9, in which each replay field contains the first light footprint 451 of the sequence of light footprints of FIG. 4. In particular, FIG. 9 shows how first-order replay fields 901 are formed in both the (positive and negative) x direction and the y direction adjacent to the zero-order replay field 900. The zero-order 900 and first-order 901 replay field intensities are attenuated (from the central point on the replay plane corresponding to the propagation axis of the spatially modulated light) by the intensity envelope—e.g. since profile—in both the x and y dimensions of the replay plane. As the skilled person will appreciate, second and subsequent order replay fields are formed, displaced further from the zero-order replay field, but these are not shown for in FIG. 9 for ease of illustration. In the present description, the first-order replay fields, together with any subsequent-order replay fields, are referred to as "higher-order replay fields".

The higher-order replay fields are generally not desired. Accordingly, conventionally, the higher-order replay fields are blocked (e.g. by baffles and the like) within the holographic projector so that they do not reach the replay plane. However, the light forming the higher-order replay fields may comprise a significant proportion of the optical power of the holographic projector, which corresponds to the power of the light that is input to the system (e.g. light incident on the spatial light modulator). Thus, blocking the higher-orders can be considered optically inefficient as optical power is lost from the system.

As described herein, a LIDAR system comprises a holographic projector that projects a holographic reconstruction, which forms a light footprint in the scene. The light footprint is an illumination pattern of structured light for probing or surveying the scene contained within the field of view. In certain applications, such as automotive applications, the desired field of view of a LIDAR system has a relatively high aspect ratio. In particular, such applications may require a relatively large field of view horizontally (e.g. +/−60°) and a relatively small field of view vertically (e.g. +/−15°). Optical efficiency, in terms of the proportion of the power emitted by the light source that is used to illuminate the scene, is an important metric for LIDAR systems. A system with low optical efficiency requires higher power light sources (e.g. lasers) to be used to achieve a given illumination into the scene which increases cost, increases heat-sinking requirements (i.e. size) and decreases the overall electrical efficiency. Electrical efficiency is a particularly important consideration for electric vehicle applications.

Accordingly, in some embodiments, the holographic projector forms a light footprint in the scene wherein the field of view (corresponding to the surveyed scene) of the projected illumination includes some light from higher-order replay fields in addition to the light of the primary-order (zero-order) replay field.

FIGS. 10A-10D shows an example using the sequence of light footprints of FIG. 4. By way of example, each replay field comprises the same array of discrete light spots that is repositioned in raster scan order across the replay plane, for example using a software grating, to form the sequence of light footprints, as described herein. In consequence, adjacent light footprints of the first-order replay fields are correspondingly repositioned if they are not blocked from reaching the scene.

In the example of FIGS. 10A-10D, the output illumination of the projector is formed in a so-called "hybrid field of view" 1010. The hybrid field of view encompasses the entire zero-order replay field and a portion of each of the first-order replay fields to either side (in the +/−x direction). Thus, the hybrid field of view is an expanded set of sub areas of the scene corresponding to an expanded field of view of a detector. The hybrid field of view is effectively a fixed window, defining the extent of the field of view, which captures the entire zero-order replay field for all light footprints in the sequence (i.e. all grating positions) and different portions of the two first-order replay fields in the +/−x direction for the different light footprints in the sequence, depending upon the displacement thereof by the software grating.

Figure 10A:
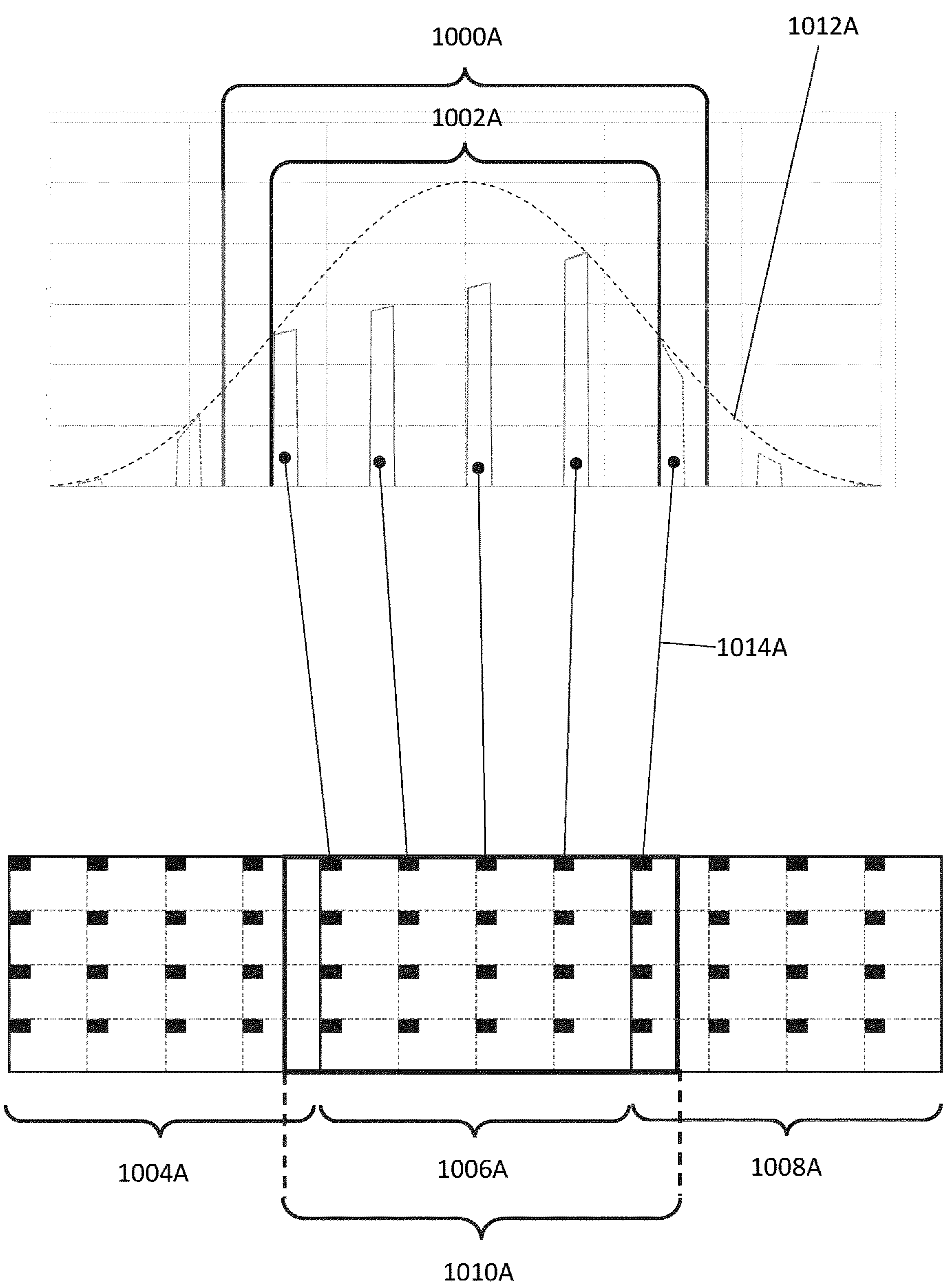
FIG. 10A-D show the holographic reconstruction of FIG. 9, with the y-direction first order replay fields blocked out, in a temporal sequence of positions on the replay plane, with a widened field of view forming a hybrid replay field in accordance with further embodiments.

FIG. 10A (bottom) shows a first light footprint of a sequence of light footprints formed in a scene divided into a plurality of sub areas as described above with reference to FIG. 4. In particular, FIG. 10A shows the light spots of the array of light spots of the light footprint positioned in their respective sub areas in accordance with the first light footprint 451 of the sequence of FIG. 4. The first light footprint is formed without a grating function applied, such that there is no displacement of the replay fields on the replay plane with respect to the sinc$^2$ intensity distribution envelope. A hybrid field of view 1010A is formed by an array of sub areas that are illuminated by the array of light spots of the sequence of light footprints formed by the zero-order replay field 1006A, and respective portions of the sub areas adjacent thereto, in the x direction, that are illuminated by the array of light spots of the sequence formed by the respective first-order replay fields 1004A, 1008A (in the negative and positive x direction, respectively). In the illustrated example, the portion of the adjacent sub areas corresponds to a half of each adjacent sub area. Thus, in this example, the hybrid field of view expands the field of view of the LIDAR system in the x direction by the width of a sub area (one half the width of sub area on each side). In consequence, the hybrid field of view 1010A includes a column of light spots of the first-order replay field 1008A (i.e. on the right-hand side of the zero-order replay field 1006A). However, the hybrid field of view 1010A does not include any light spots of the first-order replay field 1004A (i.e. to the left-side of the zero-order replay field 1006A). FIG. 10A (top) also shows the intensity profile of the top row of light spots of the array of light spots of the first light footprint formed in the hybrid field of view 1010A, which are compensated for sinc$^2$ intensity variation to minimise the variance in illumination over the scene for the sequence of light footprints as described above in relation to FIG. 8. The corresponding sinc$^2$ intensity envelope 1012A (first sinc$^2$ function) is illustrated for reference.

Figure 10B:
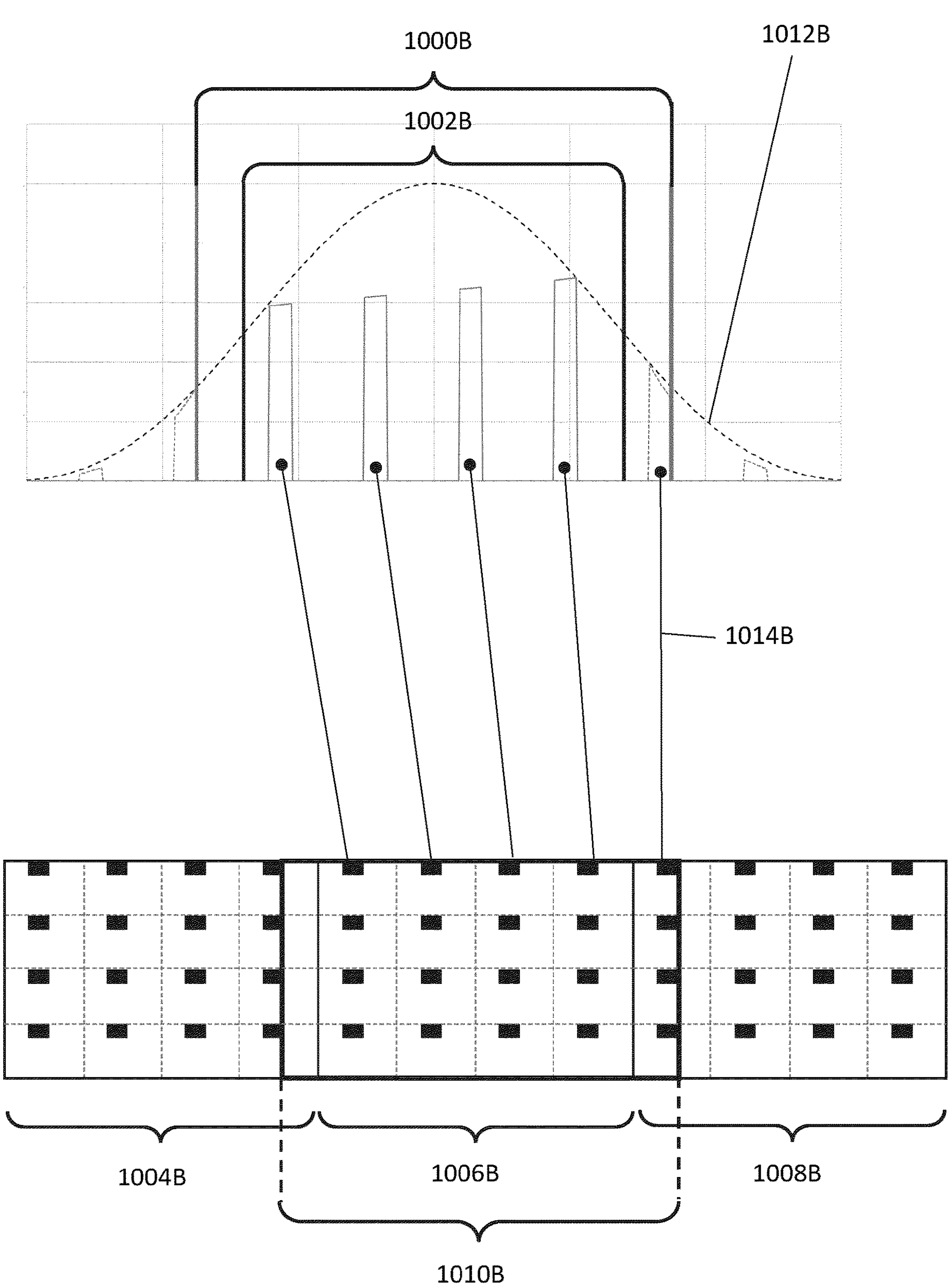

FIG. 10B (bottom) shows a second light footprint of a sequence of light footprints formed in the plurality of sub areas of the scene of FIG. 10A, with the light spots of the array of light spots of the light footprint positioned in their respective sub areas in accordance with the second light footprint 452 of the sequence of FIG. 4. The second light footprint is formed with a grating function applied, such that there is a displacement of the replay fields on the replay plane (in the positive x direction) with respect to the sinc$^2$ intensity envelope.

Accordingly, the hybrid field of view 1010B is formed by an array of sub areas that are illuminated by the array of light spots of the sequence of light footprints formed by the zero-order replay field 1006B, and respective portions of the sub areas adjacent thereto, in the x direction, that are illuminated by the array of light spots of the sequence formed by the respective first-order replay fields 1004B, 1008B. Thus, in this position, the hybrid field of view 1010B includes a column of light spots of the first-order replay field 1008B (i.e. to the right-side of the zero-order replay field 1006B) that is displaced in the x direction from the corresponding column of light spots of the first-order replay field 1008A of FIG. 10A. However, once again, the hybrid field of view 1010B does not include any light spots of the first-order replay field 1004B (i.e. to the left-side of the zero-order replay field 1006B). FIG. 10B (top) shows the intensity profile of the top row of light spots of the array of light spots of the second light footprint formed in the hybrid field of view 1010B. The sinc$^2$ intensity envelope 1012B is illustrated for reference.

Figure 10C:
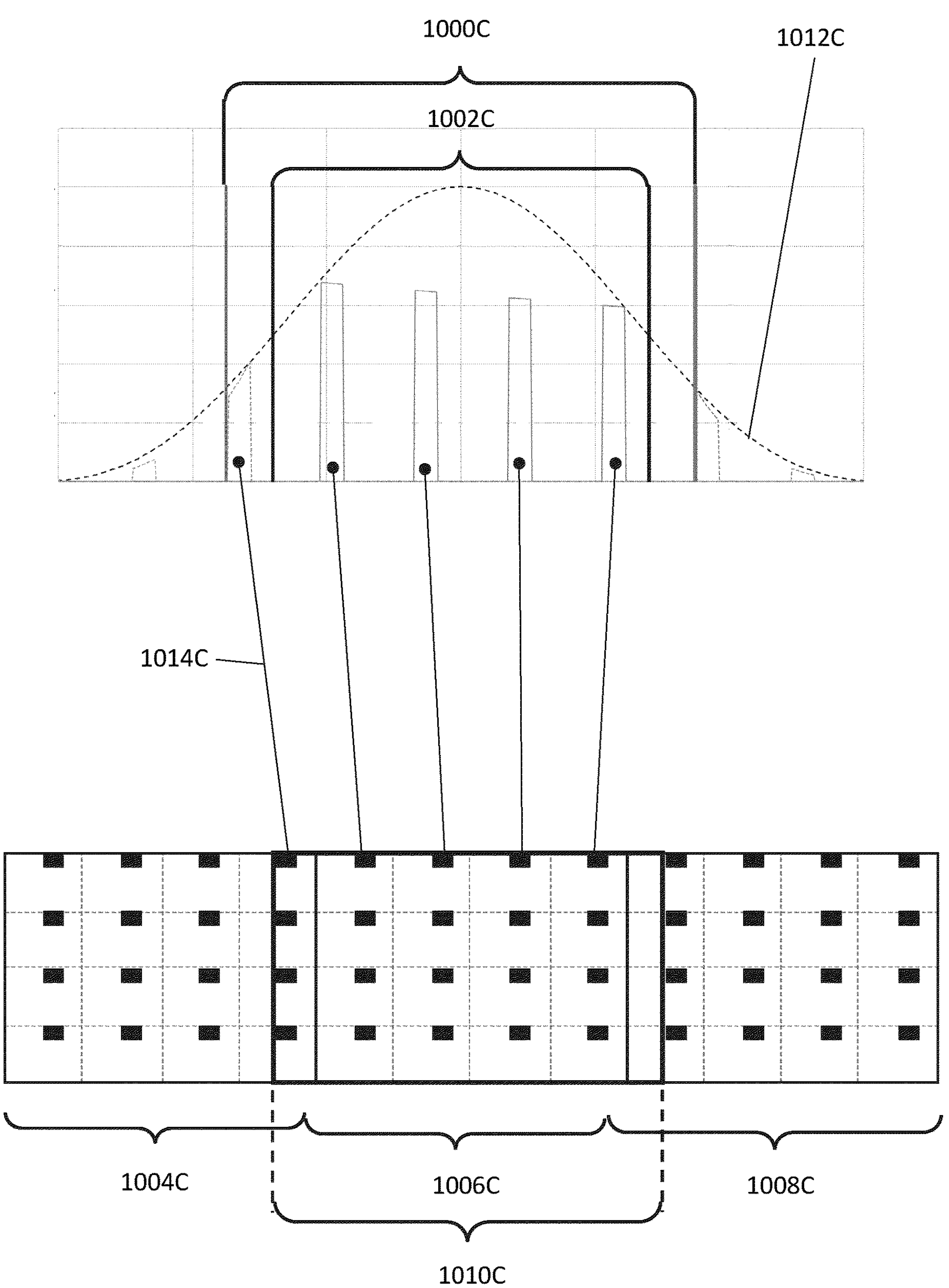

FIG. 10C (bottom) shows a third light footprint of a sequence of light footprints formed in the plurality of sub areas of the scene of FIG. 10A, with the light spots of the array of light spots of the light footprint positioned in their respective sub areas in accordance with the third light footprint of the sequence of FIG. 4. The third light footprint is formed with a grating function applied, such that there is a larger displacement of the replay fields on the replay plane (in the positive x direction) with respect to the sinc$^2$ intensity distribution envelope. Accordingly, the hybrid field of view 1010C is formed by an array of sub areas that are illuminated by the array of light spots of the sequence of light footprints formed by the zero-order replay field 1006C, and respective portions of the sub areas adjacent thereto, in the x direction, that are illuminated by the array of light spots of the sequence formed by the respective first-order replay fields 1004C, 1008C. Thus, in this position, the hybrid field of view 1010C includes a column of light spots of the first-order replay field 1004C (i.e. to the left side of the zero-order replay field 1006C). However, in this case, the hybrid field of view 1010C does not include any light spots of the first-order replay field 1008C (i.e. to the right-side of the zero-order replay field 1006C). FIG. 10C (top) shows the intensity profile of the top row of light spots of the array of light spots of the third light footprint formed in the hybrid field of view 1010C. The sinc$^2$ intensity envelope 1012C is illustrated for reference.

Figure 10D:
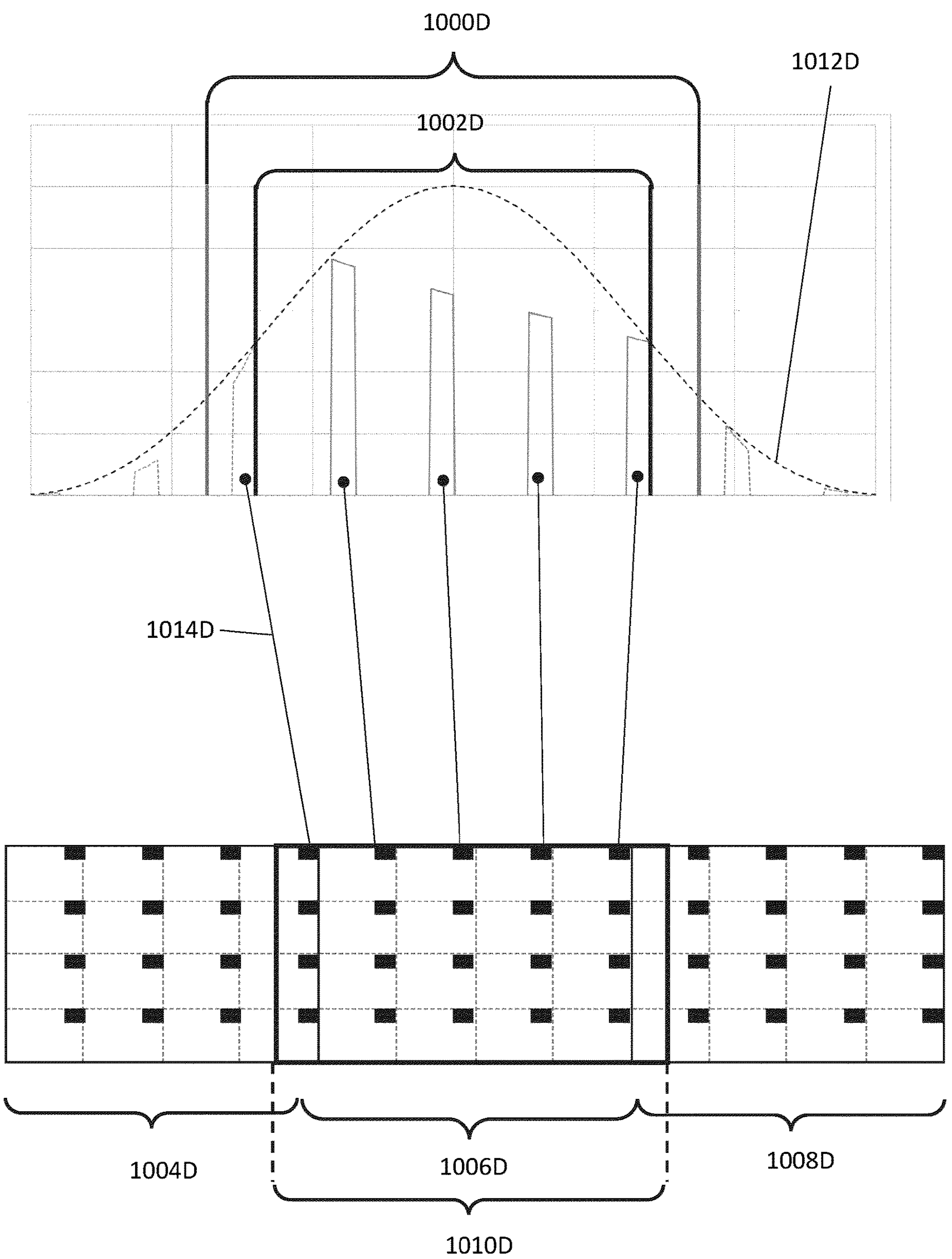

Finally, FIG. 10D (bottom) shows a fourth light footprint of a sequence of light footprints formed in the plurality of sub areas of the scene of FIG. 10A, with the light spots of the array of light spots of the light footprint positioned in their respective sub areas in accordance with the fourth light footprint of the sequence of FIG. 4. The fourth light footprint is formed with a grating function applied, such that there is a still larger displacement of the replay fields on the replay plane (in the positive x direction) with respect to the sinc$^2$ intensity envelope. Accordingly, the hybrid field of view 1010D is formed by an array of sub areas that are illuminated by the array of light spots of the sequence of light footprints formed by the zero-order replay field 1006D, and respective portions of the sub areas adjacent thereto, in the x direction, that are illuminated by the array of light spots of the sequence formed by the respective first-order replay fields 1004D, 1008D. Thus, in this position, the hybrid field of view 1010D includes a column of light spots of the first-order replay field 1004D (i.e. to the left-side of the zero-order replay field 1006D) that is displaced in the x direction from the corresponding column of light spots of the first-order replay field 1004D of FIG. 10C. However, once again, the hybrid field of view 1010D does not include any light spots of the first-order replay field 1008D (i.e. to the right-side of the zero-order replay field 1006D). FIG. 10D (top) shows the intensity profile of the top row of light spots of the array of light spots of the fourth light footprint formed in the hybrid field of view 1010D. The $sinc^2$ intensity envelope 1012D is illustrated for reference.

Accordingly, over the four grating positions used to form the first four light footprints in the scanning sequence shown in FIGS. 10A-10D, first-order light illuminates the additional regions (within additional sub areas of the scene) beyond the zero-order in the x direction (positive and negative). In particular, an additional column of light spots is formed by each light footprint in the sequence to scan the additional sub area portions included in the expanded field of view.

As the skilled person will appreciate, the combined intensity profile of all the light spots formed by the four light footprints of FIGS. 10A-10D (top) show substantial uniformity of illumination equivalent to FIG. 7A (top). However, the intensity in the extreme edges of the field of view is (necessarily) lower than in the centre. Such a reduction in intensity is generally acceptable.

Figure 11:
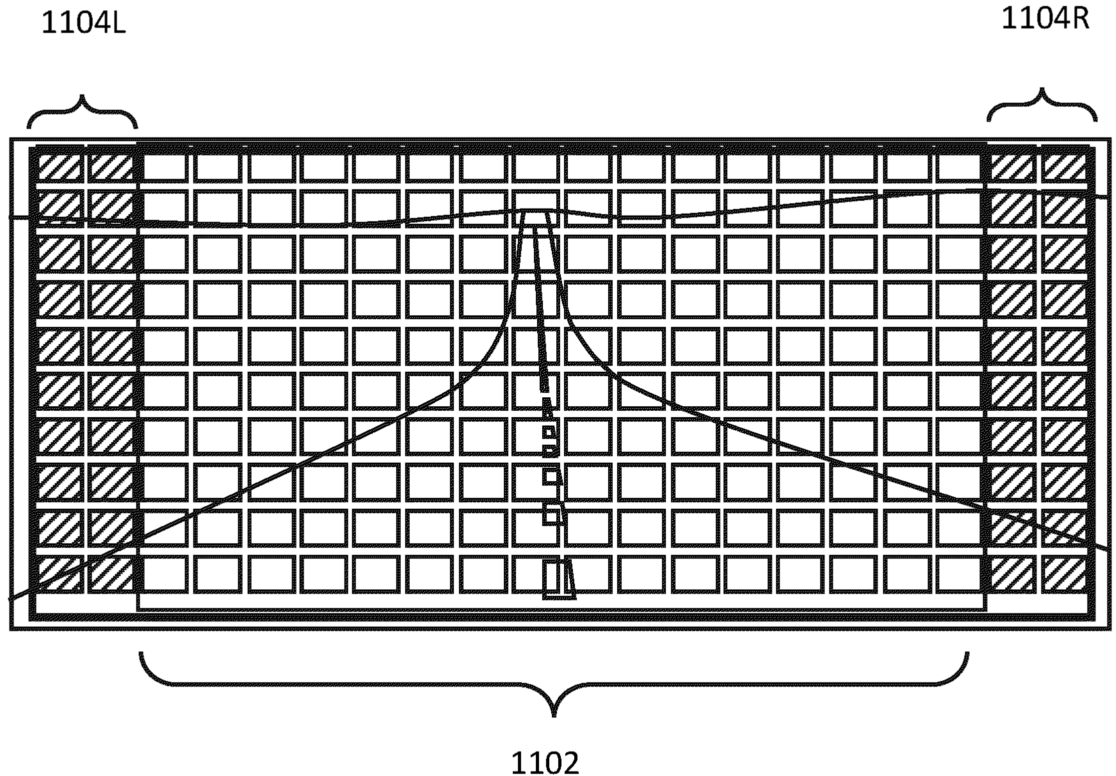
FIG. 11 shows another example of a widened field of view forming a hybrid replay field of a scene in an automotive example in accordance with embodiments.

For example, in automotive LIDAR applications, the range sensing requirements (and therefore the illumination power required to obtain a threshold signal to noise ratio) is lower at wide angles of the surveyed scene as illustrated in FIG. 11 described further below. Use of some first order light is particularly suitable for illumination patterns which cover a wide range, in the x and/or y directions, with periodic variation (e.g. a periodic array of light features corresponding to multiple sub areas) because the hybrid field of view formed by the first-order and zero-order provides a seamless pattern.

In some embodiments, the hologram may be calculated or otherwise configured to control the intensity of the light spots in the zero- and first-order replay fields that are used to form the array of light spots formed in the hybrid field of view for each the light footprint in the sequence. For instance, it may be desirable to adjust (e.g. increase or decrease) the intensity of the light spots formed in first-order, the zero-order or both. This may be achieved in a similar way as reducing the variance in intensity of the array of light spots of a light footprint of the primary order (zero-order), as described above.

FIG. 11 shows an example of a hybrid field of view comprising a surveyed scene in an automotive LIDAR application. The zero-order replay field forms a light footprint in an array of sub areas 1102 of the scene, comprising the field of view including the road ahead of the vehicle. In the illustrated example, the scene is divided into an array of 16×10 quadrilateral sub areas, which are each individually scanned by a projected light footprint comprising an array of lights features (e.g. an array of (e.g. 16×10) discrete light spots or an array of one or more scanning lines) as described herein. The hybrid field of view includes all the sub areas of the zero-order. Additionally, the hybrid replay field includes a pair of columns of 10 sub areas of the first-order to the left side of the zero-order 1104L and a pair of columns of 10 sub areas of the first-order to the right side of the zero-order 1104R. Thus, in this example, the hybrid field of view includes complete sub areas of the first-order. Thus, in contrast to the example of FIGS. 10A-10D, the expanded regions of the hybrid field of view receive first-order light throughout the sequence of light footprints (i.e. at all grating positions).

The inclusion of a portion of the first-order replay field (in the positive and negative x direction) in a hybrid replay field/field of view has several advantages. First, optical efficiency is increased. In particular, the efficiency of delivery of illumination into the scene is improved because optical power is necessarily used in the first-orders due to the holographic diffractive process. By using at least some of the first-order light to illuminate the scene, the optical efficiency of the system is increased. Secondly, the field of view is increased or expanded, conveniently providing the high aspect ratio required for surveying a scene in automotive applications.

Accordingly, in some embodiments, the detection system is arranged to detect light spots of an expanded hybrid field of view, as described above. In particular, the detection system is arranged to detect lights spots of the zero-order replay field and light spots of at least one higher-order replay field, in order to expand the field of view of the LIDAR system. Thus, the detection system is able to detect light reflected from additional sub areas of the scene illuminated by light spots of first-order light.

In some embodiments, the light features (e.g. light spots) of the at least one higher order replay field that are detectable by the detection system are formed in sub areas of the scene immediately adjacent the (peripheral) sub areas corresponding to light features formed in the zero-order replay field. In some examples, the region comprising the sub-areas of the at least one higher-order replay field constitutes less than 50%, such as less than 30%, of the total area of the at least one higher-order replay field. The combined approach of illuminating sub areas of the scene with a light footprint/illumination pattern comprising a regular array of light features is well suited for combination with use of some of the first-order replay field/s to illuminate the scene, because the repeat block pattern is reproduced at the edges (in the x and y directions) of the zero-order.

Figure 12:
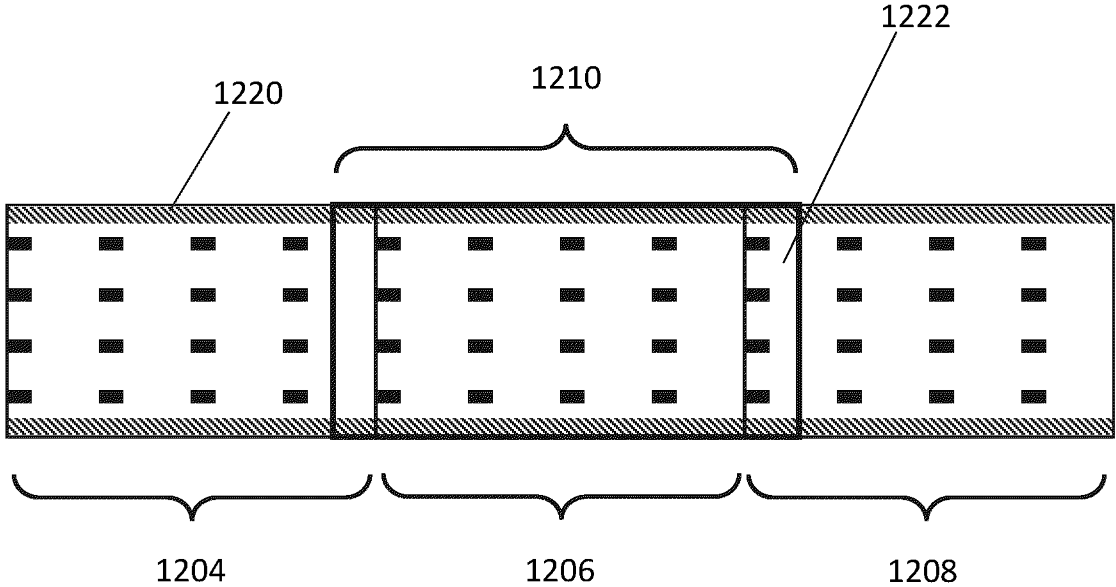
FIG. 12 shows the hybrid replay field of FIG. 10A with noise dumps formed at top and bottom edges in accordance with embodiments.

In some embodiments, the hybrid field of view may be surrounded on some sides—e.g. the top and bottom—by "noise dump" regions. British patent 2,501,112, incorporated herein by reference, describes the concept of a noise dump in holographic system in which light patterns are projected using phase holograms. In some embodiments, regions forming the edges of the sub areas of the zero- and first-orders (e.g. forming the hybrid field of view) may be used as noise dumps. For example, FIG. 12 shows a hybrid field of view 1210 illuminated by a light footprint. The hybrid field of view 1210 comprises the zero-order 1206 and a part 1222 of each first-order 1204, 1206 adjacent each side of the zero-order 1206 in the x direction, similar to FIG. 10A (bottom). Regions at the top and bottom edges 1222 (which may be inside or outside the respective sub areas of the scene) may be used as noise dumps. Embodiments incorporate higher-order replay fields in the x direction and noise dumps in the y direction, or vice versa, such that the noise dump areas of the zero-order and higher-orders are outside hybrid field of view. In contrast, with reference to FIG. 12, if the noise dumps were provided to the left- and right-hand side of the replay fields 1206, they would be inside the field of view of the system.

LIDAR System Diagram

Figure 13:
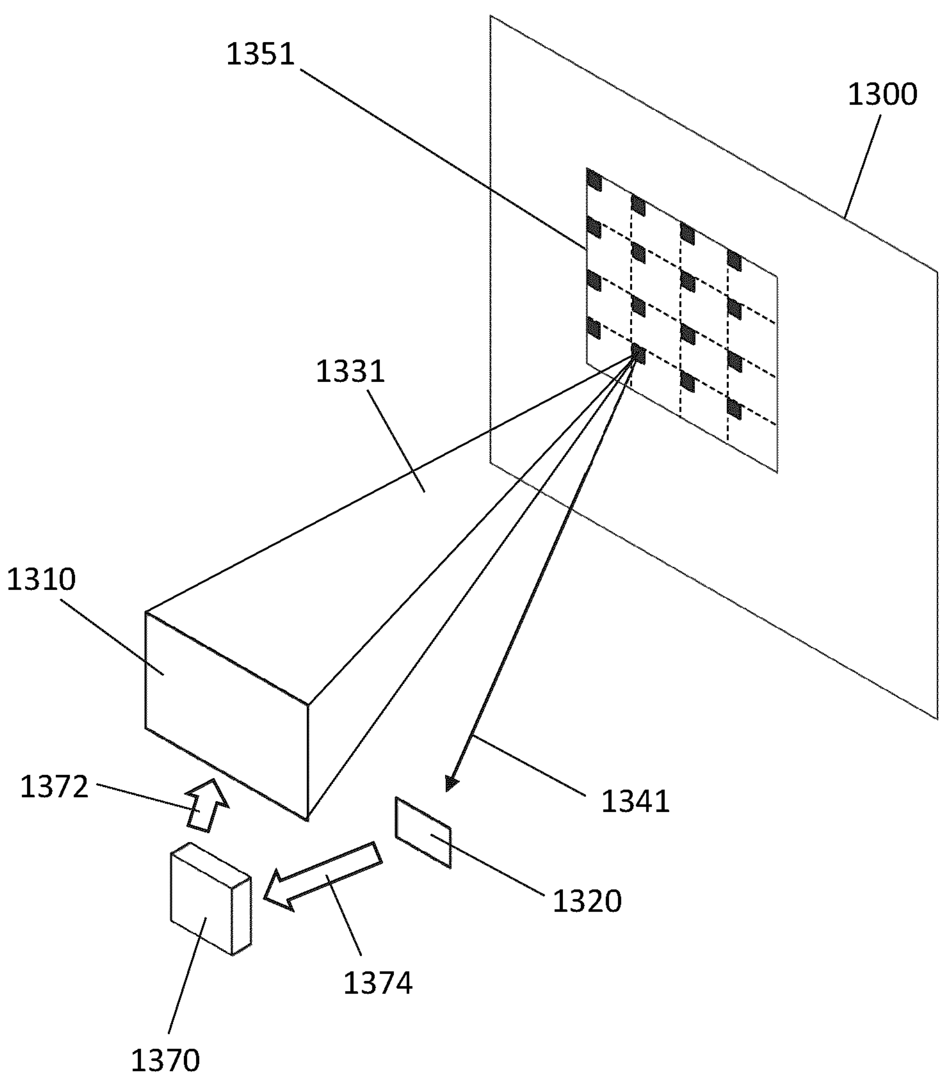
FIG. 13 shows a LIDAR system in accordance with embodiments.

FIG. 13 shows an embodiment comprising a spatial light modulator 1310 of a holographic projector arranged to direct light to a scene 1300 and a light detector 1320 arranged to collect reflected light from the scene. Spatial light modulator 1310 is arranged to receive light from a light source (not shown) and output spatially modulated light in accordance with a dynamically-variable diffractive pattern comprising a computer-generated hologram represented or "displayed" on the spatial light modulator 1310. FIG. 13 shows the spatial light modulator 1310 outputting first spatially modulated light 1331 forming a first light footprint 1351, comprising an array of light features comprising light spots, of a zero-order replay field within the scene 1300 in accordance with a first computer-generated hologram (not shown) represented on the spatial light modulator 1310. As described herein, the holographic projector may directly project the spatially modulated light onto the scene 1300 or may include optics, such as magnifying optics and/or a projection lens, to project a holographic reconstruction formed on a replay plane within the holographic projector onto the scene 1300. One or more optical elements may be used to expand the replay field up to a large emission aperture so as to magnify the sub areas—thus controlling the size of the field of view and the sub areas thereof. FIG. 13 shows that all light spots of the array of light spots are formed at the same time by the first spatially modulated light 1331. As described herein, the light detector 1320 may comprise an array detector having a field of view comprising the surveyed scene divided into sub areas. Each light detecting element in the array has an individual field of view (IFOV) comprising part of a sub area of the scene 1100. The first light footprint may be part of a sequence of light footprints comprising an array of light spots as described herein. A system controller 1370 may dynamically change the diffractive pattern displayed on the spatial light modulator 1310, so as to form such a sequence of light footprints, by outputting a drive signal 1372.

FIG. 13 further shows light detector 1320 receiving reflected light 1341 from regions of the scene 1300 illuminated by the first light footprint 1351. By way of example only, FIG. 13 shows light being reflected from only one part of the scene. For example, the light of a light spot of the array of light spots may be reflected off an object in the scene. The reader will understand that light may be reflected from multiple parts of the scene during one illumination event—i.e. one frame of the LIDAR system. In response to receiving the reflected light 1341, light detector 1320 outputs a light response signal 1374. The system controller 1370 is arranged to receive and process the light response signal 1374 and determine a time of flight measurement, identify features of the scene from the reflected light and the like, as known in the art. In embodiments, the controller 1370 may determine if the light response signal 1374 indicates that an object is present in one or more of the regions of the scene illuminated or "probed" by a light spot of the array of light spots of the first light footprint. In some embodiments, the property of the light response signal 1374 is the maximum (or peak) intensity or average (or mean) intensity of the light response signal 1374. In other embodiments, the property of the light response signal 1374 is change in the intensity of the light response signal 1374 or a rate of change of intensity in the light response signal 1374. The property of the light response signal may be any property of the light response signal 1374, or any feature in the light response signal 1374, which may provide information about the area(s) probed or any objects in the area(s) probed by the first light footprint 1351. For example, the controller 1370 may determine if the magnitude of the light response signal 1374 exceeds a threshold value. The feedback signal may be provided to the controller 1370 by the light detector 1320 with the light response signal 1374. Alternatively, the feedback signal may be provided separately. The light detector may be a CCD array or SPAD array and the light projected into the scene may be visible light or infra-red light.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A light detection and ranging, (LIDAR) system for surveying a scene, the system comprising:

a spatial light modulator configured to display a diffractive pattern comprising a hologram of a light footprint, wherein the light footprint comprises an array of light features;

a light source configured to illuminate the diffractive pattern to form a holographic reconstruction of the light footprint, wherein the holographic reconstruction of the light footprint is projected onto the scene;

a display driver configured to control the spatial light modulator and change the diffractive pattern with time such that each light feature of the array of light features scans a respective sub-area of a plurality of sub-areas of the scene; and a detection system comprising a plurality of light detection elements, wherein the detection system is configured such that each light detection element detects light from a respective individual field of view within the scene and each sub-area of the scene contains a plurality of individual fields of view.

2. The system according to claim 1, wherein the plurality of sub-areas forms a substantially continuous area of the scene, or the sub-areas are substantially non-overlapping.

3. The system according to claim 1, wherein each light feature comprises at least one selected from a group comprising: a light spot, a pattern of light spots, a scanning line and a plurality of parallel scanning lines.

4. The system according to claim 1, wherein the display driver is configured to control the spatial light modulator so that optical power in each sub-area is eye safe during scanning thereof.

5. The system according to claim 1, wherein the display driver is configured to change the hologram of the diffractive pattern in order to scan the sub-areas of the scene.

6. The system according to claim 1, wherein the holographic reconstruction is formed on a holographic replay plane, and wherein the diffractive pattern further comprises a grating function that determines a position of the light footprint on the holographic replay plane and the display driver is configured to change the grating function of the diffractive pattern in order to scan the sub-areas of the scene.

7. The system according to claim 6, wherein the system is configured to configure the hologram to compensate for a non-uniformity in intensity across the holographic replay plane based on a $sinc^2$ compensation function applied to the light footprint, wherein the $sinc^2$ compensation function is applied to a light footprint comprising the array of light features each positioned substantially in the middle of its respective sub area.

8. The system according to claim 7, wherein the system is configured to configure the hologram to increase the intensity of light features in a central region of the light footprint to reduce a variance in the intensity of the light features during scanning.

9. The system according to claim 6, wherein the holographic replay plane is an x-y plane spatially separated from the spatial light modulator by a propagation distance, z, and the grating function comprises an x-direction grating and a y-direction grating.

10. The system according to claim 1, wherein the display driver is configured to change the diffractive pattern such that each light feature performs a scan at a plurality of positions along a scanning path within its sub areas.

11. The system according to claim 1, wherein the display driver is configured to change the diffractive pattern such that each light feature performs a patterned scan of its sub-area.

12. The system according to claim 1, wherein an exposure time associated with each light detection element is constant and the display driver is further configured to change the hologram in order to reduce optical power in a sub-area if a detected signal from that sub-area indicates that the corresponding light detection element is saturated.

13. The system according to claim 1, further comprising an optical system configured to magnify the sub-areas.

14. The system according to claim 1, wherein the light footprint projected onto the scene is such that a periodicity of the array of light features formed in a zero order replay field extends into at least one first order holographic replay field.

15. The system according to claim 1, wherein the detection system is configured to detect light features of a zero order holographic replay field and light features of a part of at least one higher order holographic replay field.

16. The system according to claim 15, wherein the light features of the at least one higher order holographic replay field that are detectable by the detection system are formed in sub-areas immediately adjacent to sub areas scanned by light features of the zero order holographic replay field.

17. The system according to claim 16, wherein a region comprising the sub-areas of the at least one higher order holographic replay field constitutes less than 50% of a total area of the at least one higher order holographic replay field.

18. The system according to claim 1, wherein the system is configured to configure the hologram so that an intensity of light features of the array of light features varies with distance from a propagation axis of projected light.

19. A method of light detection and ranging, (LIDAR), for surveying a scene, the method comprising:

dividing a field of view into a plurality of sub-areas of the scene;

displaying a diffractive pattern comprising a hologram of a light footprint on a spatial light modulator, wherein the light footprint comprises an array of light features;

illuminating the diffractive pattern to form a holographic reconstruction of the light footprint and projecting the reconstructed light footprint onto the scene;

controlling the spatial light modulator to change the diffractive pattern with time, such that each light feature of the array of light features scans a respective sub-area of the scene;

detecting light by a plurality of light detecting elements, wherein each light detecting element is configured to receive light from a respective individual field of view within the scene, and configuring the plurality of light detecting elements so that each sub-area of the scene contains a plurality of individual fields of view of the light detecting elements.

20. The system according to claim 7, wherein the holographic replay plane is an x-y plane spatially separated from the spatial light modulator by a propagation distance, z, and the grating function comprises an x-direction grating and a y-direction grating.

* * * * *